(12) United States Patent
Sakurai

(10) Patent No.: US 8,655,081 B2
(45) Date of Patent: Feb. 18, 2014

(54) LANE RECOGNITION SYSTEM, LANE RECOGNITION METHOD, AND LANE RECOGNITION PROGRAM

(75) Inventor: Kazuyuki Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 394 days.

(21) Appl. No.: 12/808,032

(22) PCT Filed: Jan. 8, 2009

(86) PCT No.: PCT/JP2009/050124
§ 371 (c)(1),
(2), (4) Date: Jun. 14, 2010

(87) PCT Pub. No.: WO2009/088035
PCT Pub. Date: Jul. 16, 2009

(65) Prior Publication Data
US 2010/0284569 A1 Nov. 11, 2010

(30) Foreign Application Priority Data

Jan. 11, 2008 (JP) ................................. 2008-004275

(51) Int. Cl.
*G06K 9/62* (2006.01)
*G06K 9/36* (2006.01)
*G06K 9/48* (2006.01)
*G06K 9/32* (2006.01)

(52) U.S. Cl.
USPC ............ 382/216; 382/284; 382/199; 382/296

(58) Field of Classification Search
None
See application file for complete search history.

(56) References Cited

U.S. PATENT DOCUMENTS

2002/0031242 A1* 3/2002 Yasui et al. .................. 382/104
2004/0042638 A1* 3/2004 Iwano .......................... 382/104
2007/0237420 A1* 10/2007 Steedly et al. ................ 382/284
2010/0266161 A1* 10/2010 Kmiecik et al. .............. 382/103

FOREIGN PATENT DOCUMENTS

| EP | 1170173 A2 | 1/2002 |
| EP | 1725035 A1 | 11/2006 |
| GB | 2353205 A | 8/2001 |
| JP | 9-167239 A | 6/1997 |

(Continued)

OTHER PUBLICATIONS

Supplementary European Search Report for EP 09 70 0415 issued Jan. 17, 2012.

(Continued)

*Primary Examiner* — Bhavesh Mehta
*Assistant Examiner* — David F Dunphy
(74) *Attorney, Agent, or Firm* — Sughrue Mion, PLLC

(57) ABSTRACT

To provide a lane recognition system which can improve the lane recognition accuracy by suppressing noises that are likely to be generated respectively in an original image and a bird's-eye image. The lane recognition system recognizes a lane based on an image. The system includes: a synthesized bird's-eye image creation module which creates a synthesized bird's-eye image by connecting a plurality of bird's-eye images that are obtained by transforming respective partial regions of original images picked up at a plurality of different times into bird's-eye images; a lane line candidate extraction module which detects a lane line candidate by using information of the original images or the bird's-eye images created from the original images, and the synthesized bird's-eye image; and a lane line position estimation module which estimates a lane line position based on information of the lane line candidate.

18 Claims, 19 Drawing Sheets

(56) References Cited

FOREIGN PATENT DOCUMENTS

| JP | 2000242769 A | 9/2000 |
|---|---|---|
| JP | 2002120675 A | 4/2002 |
| JP | 2002175534 A | 6/2002 |
| JP | 2003067755 A | 3/2003 |
| JP | 2003346163 A | 12/2003 |
| JP | 2004145852 A | 5/2004 |
| JP | 2004246641 A | 9/2004 |
| JP | 2005276041 A | 10/2005 |
| JP | 2005346197 A | 12/2005 |
| JP | 2005346384 A | 12/2005 |
| JP | 2005346385 A | 12/2005 |
| JP | 2007052730 A | 3/2007 |
| JP | 2007096497 A | 4/2007 |
| JP | 2007249392 A | 9/2007 |
| WO | 9906943 A1 | 2/1999 |

OTHER PUBLICATIONS

R. Danescu et al., "Lane Geometry Estimation in Urban Environments Using a Stereovision System", Intelligent Transoortation Systems Conference, ITSC 2007, IEEE, pp. 271-276.
M. Bertozzi et al., "Obstacle and Lane Detection on ARGO", Intelligent Transportation Systems, ITSC '97, pp. 1010-1015, 1997.
M. M. Trivedi et al., "Looking-In and Looking-Out of a Vehicle: Computer-Vision-Based Enhanced Vehicle Safety", IEEE Transaction on Intelligent Transformation Systems, vol. 8, No. 1, Mar. 1, 2007.
J. M. Collado et al., "Detection and Classification of Road Lanes with a Frequency Analysis", Intelligent Vehicles Symposium, IEEE, 2005, pp. 78-83.
R. Chapuis et al., "Road Detection and Vehicles Tracking by Vision for an On-Board ACC Systems in the VELAC Vehicle", Information Fusion, Proceedings of the Third Intern Ational Conference, 2000, pp. 11-18.
D. Pomerleau, "RALPH: Rapidly Adapting Lateral Position Handler", Intelligent Vehcles '95 Symposium, IEEE, 1995, pp. 506-511.
N. Apostoloff et al., "Robust Vision based Lane Tracking using Multiple Cues and Particle Filtering", Intelligent Vehicles Symposium, 2003, IEEE, 2003, pp. 558-563.
S. Kim et al., "An Intelligent and Integrated Driver Assistance System for Increased Safety and Convenience Based on All-around Sensing", Journal of Intelligent and Robotic Systems, vol. 51, No. 3, 2007, pp. 261-287.
R. Alix et al., "Flat World Homography for Non-Flat World On-Road Obstacle Detection", Intelligent Vehicles Symposium, IEEE, 2003, pp. 310-315.
International Search Report for PCT/JP2009/050124 mailed Feb. 3, 2009.
European Patent Office Action for EP09700415.4-1901 dated Feb. 19, 2013.
Luo R C et al: "A tutorial on multisensor integration and fusion", Signal Processing and System Control, Factory Automation. Pacific Grove, Nov. 27-30, 1990; [Proceedings of the Annual Conference of the Industrial Electronics Society. (IECON)], New York, IEEE, US, vol. CONF. 16, Nov. 27, 1990, pp. 707-722, XP010038257, DOI: 10.1109/IECON.1990.149228 ISBN: 978-0-87942-600-2.

\* cited by examiner

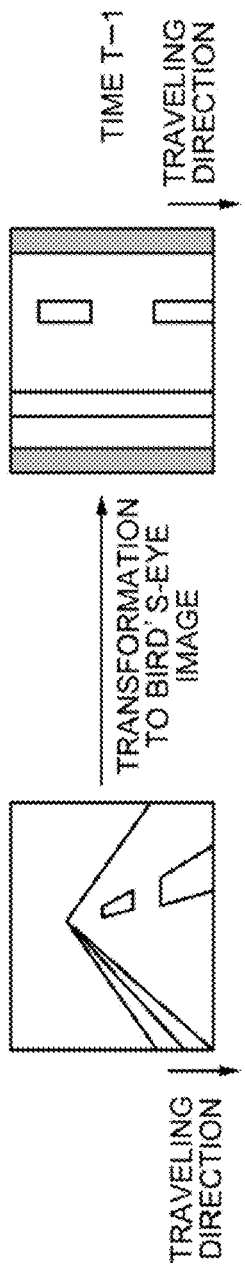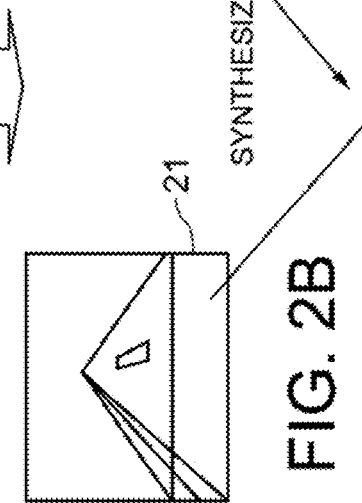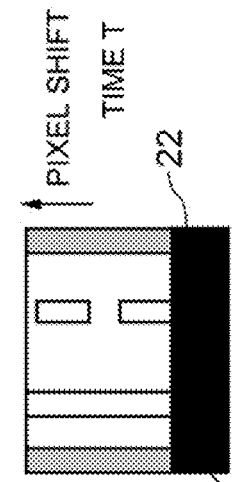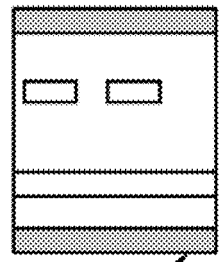

FIG. 19A
FIG. 19B
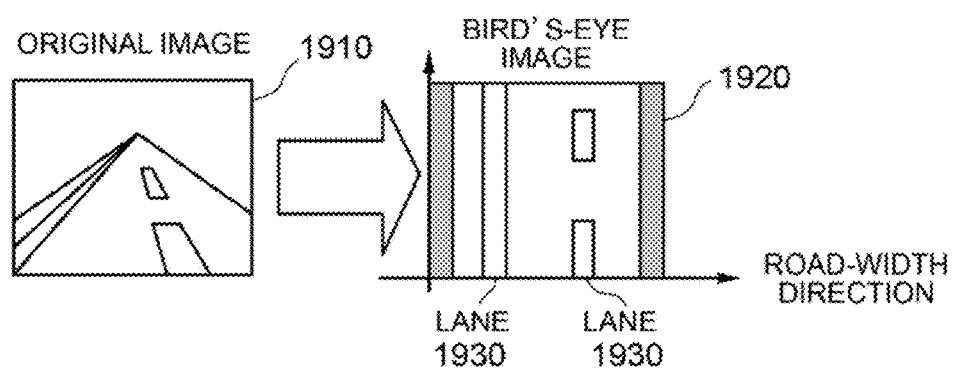
FIG. 19C
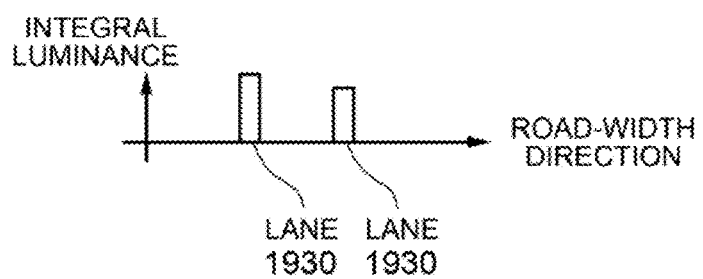

LANE RECOGNITION SYSTEM, LANE RECOGNITION METHOD, AND LANE RECOGNITION PROGRAM

This Application is the National Phase of PCT/JP2009/050124, filed Jan. 8, 2009, which claims the Priority right based on Japanese Patent Application No. 2008-004275 filed on Jan. 11, 2008, and the disclosure thereof is hereby incorporated by reference in its entirety.

TECHNICAL FIELD

The present invention relates to recognition of a lane line and, more specifically, to estimation of position of a lane line by executing image processing.

BACKGROUND ART

As one of research themes of ITS (Intelligent Transport Systems) for improving the transportation efficiency and comfortableness of road traffics by applying IT technologies, there is an LKS (Lane Keep Support) system. This is a system which recognizes a lane on a road by a sensor, and controls a steering, an accelerator, a brake, and the like so that an automobile can always run on the center of a lane based thereupon.

The important thing for achieving the LKS system is a lane recognition technique. Particularly, actively studied is a technique with which an image input device such as a camera is placed in the front or rear side of a running vehicle, and the image input device processes images picked up while running on a road to recognize a lane line drawn on the road in a high-luminance color such as white or yellow.

FIG. 18 is a conceptual illustration showing an example of the structure of a widely-used lane recognition device 1800 depicted in Patent Document 1. The widely-used lane recognition device 1800 is configured with an image input device 1810, a bird's-eye image creation module 1820, a luminance profile creation module 1830, and a lane line detection module 1840.

FIG. 19 is a conceptual illustration showing actions of the lane recognition device 1800 shown in FIG. 18. FIG. 19A is an image of a road while running thereon picked up by the image input device 1810. This is called an original image 1910. The bird's-eye image creation module 1820 to which the original image 1910 is inputted creates a bird's-eye image shown in FIG. 19B from the original image 1910.

The luminance profile creation module 1830 detects integral luminance shown in FIG. 19C by each coordinate in the road-width direction by integrating luminance of coordinates in the direction orthogonal to the road-width direction of the road surface shown in the bird's-eye image 1920. At last, the lane line detection module 1840 obtains a position which corresponds to a coordinate of the road-width direction showing higher integral luminance than the integral luminance distribution to detect a lane line 1930.

Other than Patent Document 1, there are following documents regarding recognition of lanes. Patent Document 2 discloses an example of a technique which detects a lane from an original image. Patent Document 3 discloses an example of a technique which creates a synthesized bird's-eye image from bird's-eye images based on the shift amount on a plane. Patent Document 4 discloses an example of a technique which detects a position and a type of a lane from an original image. Patent Document 5 discloses an example of a technique which judges whether a lane detected from an original image is a solid line or a broken line.

Patent Document 6 discloses an example of a technique which improves lane detection accuracy by using a plurality of images of different points of time. Patent Document 7 discloses an example of a technique which improves the lane detection accuracy based on fluctuations in a luminance total value. Patent Document 8 discloses an example of a technique which improves the lane detection accuracy by judging the road surface state by providing various kinds of sensors to a vehicle.

Patent Document 9 discloses a technique which acquires a bird's-eye image of the surroundings of a vehicle by connecting a plurality of images of different points of time. Patent Document 10 discloses an example of a technique which improves the image quality when acquiring a bird's-eye image from an original image. Patent Document 11 discloses an example of a technique which improves the lane detection accuracy by separately recognizing a lane from a short distance and a long distance.

Patent Document 1: Japanese Unexamined Patent Publication 2004-145852
Patent Document 2: Japanese Unexamined Patent Publication 2000-242769
Patent Document 3: Japanese Unexamined Patent Publication 2002-120675
Patent Document 4: Japanese Unexamined Patent Publication 2002-175534
Patent Document 5: Japanese Unexamined Patent Publication 2003-067755
Patent Document 6: Japanese Unexamined Patent Publication 2003-346163
Patent Document 7: Japanese Unexamined Patent Publication 2004-246641
Patent Document 8: Japanese Unexamined Patent Publication 2005-276041
Patent Document 9: Japanese Unexamined Patent Publication 2007-096497
Patent Document 10: Japanese Unexamined Patent Publication 2007-249392
Patent Document 11: Japanese Unexamined Patent Publication Hei 09-167239

DISCLOSURE OF THE INVENTION

Problems to be Solved by the Invention

The widely-used lane recognition device 1800 shown in FIG. 18 and FIG. 19 faces such an issue that misrecognitions are likely to occur. For example, in a case where raindrops or foreign matters are attached to the image input device 1810, dot-like noises due to such raindrops and foreign matters are generated on the original image 1910. When it is transformed to the bird's-eye image 1920 by the bird's-eye image creation module 1820, white-line noises in the longitudinal directions are generated. Those noises cannot be discriminated from the lane, so that misrecognitions may occur.

In the meantime, in a case where the lane is to be detected from the luminance profile directly without transforming the original image 1910 to the bird's-eye image 1920, a video at a far distance from the image input device 1810 may become unclear. Therefore, it is difficult to recognize the lane accurately.

As described, there are noises that are likely to be generated in each of the cased where the lane is directly detected from the original image 1910 and where the lane is detected after transforming the original image 1910 into the bird's-eye image 1920, and those are the causes for generating misrecognitions. However, not only Patent Document 1 but also Patent Documents 2-11 mention nothing about the structures which can suppress the noises that are likely to be generated in each of those cases.

An object of the present invention is to provide a lane recognition device, a lane recognition method, and a lane recognition program, which can improve the lane recognition accuracy by suppressing the noises that are likely to be generated respectively in the original image and the bird's-eye image.

Means for Solving the Problems

In order to achieve the foregoing object, the lane recognition device according to the present invention is a lane recognition system which recognizes a lane based on an image. The system includes: a synthesized bird's-eye image creation module which creates a synthesized bird's-eye image by connecting a plurality of bird's-eye images that are obtained by transforming respective partial regions of original images picked up at a plurality of different times into bird's-eye images; a lane line candidate extraction module which detects a lane line candidate by using information of the original images or the bird's-eye images created from the original images, and the synthesized bird's-eye image; and a lane line position estimation module which estimates a lane line position based on information of the lane line candidate.

Further, the lane recognition method obtained by designing the present invention as a method is a lane recognition method which recognizes a lane based on an image. The method includes: creating a synthesized bird's-eye image by connecting a plurality of bird's-eye images that are obtained by transforming respective partial regions of original images picked up at a plurality of different times into bird's-eye images; detecting a lane line candidate by using information of the original images or the bird's-eye images created from the original images, and the synthesized bird's-eye image; and estimating a lane line position based on information of the lane line candidate.

Furthermore, the lane recognition program obtained by designing the present invention as a program is a lane recognition program for controlling recognition of a lane based on an image, which causes a computer to execute: synthesized bird's-eye image creation processing which creates a synthesized bird's-eye image by connecting a plurality of bird's-eye images that are obtained by transforming respective partial regions of original images picked up at a plurality of different times into bird's-eye images; lane line candidate extraction processing which detects a lane line candidate by using information of the original images or the bird's-eye images created from the original images, and the synthesized bird's-eye image; and lane line position estimation processing which estimates a lane line position based on information of the lane line candidate.

Effects of the Invention

The present invention is designed to be able to detect the position of the line as the candidate for the lane line by utilizing both the original image and the synthesized bird's-eye image, so that the noises that are likely to be generated respectively in the original image and the synthesized bird's-eye image can be offset. This makes it possible to improve the lane recognition accuracy by suppressing the noises.

BEST MODES FOR CARRYING OUT THE INVENTION

First Exemplary Embodiment

FIG. 1 is a block diagram showing the fundamental structure of a lane recognition device 10 according to a first exemplary embodiment of the invention. The lane recognition device 10 is configured with a control unit 100 and an image input device 110. The control unit 100 is a main part of a computer device that is formed with a CPU, a RAM, an OS, and the like, and executes each of the functions such as a lane line candidate detection module 120, a synthesized bird's-eye image creation module 130, a lane line candidate verification module 140, a lane line position estimation module 150, and a lane line position output module 160.

The image input device 110 is a device such as a camera which inputs an image to be a target from which a lane line is detected. Hereinafter, an image inputted from the image input device 110 is called an original image. The image input device 110 is attached to a vehicle such as an automobile. Hereinafter, the vehicle to which the image input device 110 is attached is called an own car. The control unit 100 may be loaded on the own car, and the image input device 110 and the control unit 100 may be connected through a wired connection. Further, the control unit 100 may not be loaded on the own car, and the image input device 110 and the control unit 100 may be connected through a radio connection.

The synthesized bird's-eye image creation module 130 creates a bird's-eye image synthesized based on original images that are picked up at a plurality of different times. The lane line candidate detection module 120 detects lines to be the candidates for the lane line from the original images.

The lane line candidate verification module 140 verifies whether or not the lane line candidate detected by the lane line candidate detection module 120 is appropriate for the lane line based on information regarding the surroundings of the lane line candidate position within the synthesized bird's-eye image created by the synthesized bird's-eye image creation module 130.

The lane line position estimation module 150 estimates the position of the lane line at the current time based on the position of the lane line candidate that is verified as being appropriate for the lane line by the lane line candidate verification module 140. The lane line position output module 160 outputs the lane line position of the current time estimated by the lane line position estimation module 150.

The lane line candidate detection module 120 which detects the lane line candidate from the original image, the bird's-eye image created from the original image, or the synthesized bird's-eye image and the lane line detection module 140 which verifies whether or not the detected lane line candidate is appropriate for the lane line by using the information of the synthesized bird's-eye image, the original image, or the bird's-eye image created from the original image configure a lane line candidate extraction module which detects the lane line candidate by using the information of the original image or the bird's-eye image created from the original image, and the synthesized bird's-eye image.

Further, while the lane line candidate detection module 120, the synthesized bird's-eye image creation module 130, the lane line candidate verification module 140, the lane line position estimation module 150, the lane line position output module 160 in the first exemplary embodiment shown in FIG. 1 are built as hardware, those may be built as a lane recognition program which implements the lane line candidate detection module 120, the synthesized bird's-eye image creation module 130, the lane line candidate verification module 140, the lane line position estimation module 150, the lane line position output module 160 by being executed on a CPU of a computer.

FIG. 2 is a conceptual illustration showing creation of a synthesized bird's-eye image executed by the synthesized bird's-eye image creation module 130 shown in FIG. 1. The bird's-eye image herein means an image that is obtained by transforming a scene picked up in the original image into an image that is viewed with the downward eyesight towards the vertical direction in the real world. Creation of bird's-eye image means to transform an original image into such image.

A synthesized bird's-eye image is created by using original images picked up at a plurality of different times and by connecting partial bird's-eye images that are obtained by transforming partial regions of the original images respectively. In the case shown in FIG. 2, the image input device 110 is placed to face towards the opposite direction from the traveling direction of the own car to pick up images of the rear direction of the own car. FIG. 2A is an original image at the point of time T-1, and FIG. 2B is an original image at the point of time T. In the bottom section of FIG. 2B, a part that is not picked up at time T-1 and comes within a pickup range of an original image at time T is shown as a slashed part (this is called a front region 21). Arrows in FIGS. 2A and 2C indicate the traveling direction of the own car.

FIG. 2C shows a bird's-eye image that is created from the original image of FIG. 2A at the point of time T-1. FIG. 2D is an image obtained by shifting the pixels of the bird's-eye image of FIG. 2C towards the vertical direction for the amount of the distance the own car has traveled from time T-1 to time T. The part corresponding to the front region 21 of FIG. 2B is not included in the bird's-eye image of FIG. 2C. Thus, that part turns out as a blank part 22 in the image of FIG. 2D.

Here, the synthesized bird's-eye image creation module 130 creates the synthesized bird's-eye image of FIG. 2E by filling the blank part 22 of FIG. 2D (corresponds to the front region 21 of FIG. 2B) by synthesizing the image obtained by transforming FIG. 2B into a bird's-eye image and the image of FIG. 2D.

FIG. 3 is a flowchart showing the outline of processing executed by the lane recognition device 10 shown in FIG. 1. When the processing is started, first, the image input device 110 inputs original images to be the targets of lane line detection (step S2001). Then, the lane line candidate detection module 120 detects lane line candidates (step S2002), and the synthesized bird's-eye image creation module 130 creates a synthesized bird's-eye image (step S2003).

Further, following steps S2005-2007 are repeated while there still remains an unverified lane line candidate, until there is no more unverified lane line (step S2004). In step S2005, the lane line candidate verification module 140 verifies whether or not the verification-target lane line is appropriate as a lane line from the information regarding the surroundings of the verification-target lane line candidate within the synthesized bird's-eye image. Details of the "verification" in step S2005 will be described later.

In step S2006, the lane line candidate verification module 140 adds the verification-target lane line candidate to a verification-passed candidate when the candidate has passed the verification (step S2007). When unsucceeded, the procedure is returned to step S2004. Further, the lane line position estimation module 150 estimates the lane line position at the current time based on the position of the lane line candidate that has passed the verification (step S2008). At last, the lane line position output module 160 outputs the lane line position estimated in step S2008 (step S2009).

The exemplary embodiment is structured to detect the lane line candidates from the original images and to verify those based on the information within the synthesized bird's-eye image. However, inversely, the lane line candidates may be detected from the synthesized bird's-eye image, and the lane line candidates may be verified from the information within the original images or the bird's-eye image created from the original images. Further, instead of the original images and the synthesized bird's-eye image of the exemplary embodiment, processed images obtained by applying processing such as filtering on those images may also be used.

FIG. 4 is a conceptual illustration showing an example of a noise contained in the original image at creating the bird's-eye image shown in FIG. 2. In the original image 410 shown in FIG. 4A, a foreign matter 412 such as a raindrop stays at a same position within the original image for more than a prescribed time in addition to an actual lane line 411. When this image is transformed into a synthesized bird's-eye image 420 shown in FIG. 4B by the synthesized bird's-eye image creation module 130, there is generated a longitudinal white-line noise 422 that is similar to the lane line 411, in addition to the actual lane line 421 transformed from the lane line 411 of the original image 410.

Therefore, if the lane line is to be recognized only from the synthesized bird's-eye image 420, there is a risk of misrecognizing the noise 422 as the lane line candidate. However, the foreign matter 412 that is the cause for generating the noise 422 only turns out as a dot-like partial noise in the original image 410, so that it is unlikely to be recognized as the lane line candidate.

Inversely, a far part 413 of the own car in the original image 410 does not turn out as a clear video since the distance is far. Thus, when the lane line is to be recognized only from the original image 410, there is a risk that the video of the far part 413 may become a factor for causing misrecognition. However, the video of the far part 413 is not contained in the synthesized bird's-eye image 420 created by the synthesized bird's-eye image creation module 130, so that it cannot be a factor for causing misrecognition of the lane line candidate.

That is, the exemplary embodiment is structured to detect and verify the lane line candidate respectively from the original image 410 and the synthesized bird's-eye image 420. Thus, the noises appearing in each of the images can be offset to suppress influences of those noises, so that the lane line can be recognized with high precision.

FIG. 5 is a conceptual diagram showing an example where the lane recognition device 10 shown in FIG. 1 is actually mounted to a vehicle. A camera 510 is attached to a rear part of an own car 520 that travels on a road. The camera 510 serves as the image input device 110. A pickup range 511 of the camera 510 is facing towards a direction opposite from a traveling direction 530 of the own car. The lane recognition device 10 recognizes lane lines 540 and 550 from the images picked up by the camera 510.

FIG. 6 is a block diagram showing more detailed structures of the lane line candidate detection module 120, the synthesized bird's-eye image creation module 130, the lane line candidate verification module 140, and the lane line position estimation module 150 shown in FIG. 1. The lane line candidate detection module 120 includes an original image binarization module 621 and a Hough transformation module 622. However, the lane line candidate detection module 120 is not limited only to such structure, as long as it is a means which can detect a high-luminance segment or straight line that is likely to be a lane line. The binarization module 621 and the Hough transformation module 622 configuring the lane line candidate detection module 120 may be implemented by causing a CPU of a computer to execute a program.

The synthesized bird's-eye image creation module 130 includes a pixel shifting module 631, an original image to bird's-eye image transformation module 632, and a front region adding module 633. The lane line candidate verification module 140 includes a lane line position transformation module 641, a lane line position within synthesized bird's-eye image calculation module 642, and a pixel on lane line verification module 643. The lane line position estimation module 150 includes a left-and-right lane line candidate selection module 651 and a left-and-right lane line position estimation module 652. The pixel shifting module 631, the original image to bird's-eye image transformation module 632, and the front region adding module 633 configuring the synthesized bird's-eye image creation module 130 may be implemented by causing the CPU of the computer to execute a program. Further, the lane line position transformation module 641, the lane line position within synthesized bird's-eye image calculation module 642, and the pixel on lane line verification module 643 configuring the lane line candidate verification module 140 may be implemented by causing the CPU of the computer to execute a program. Furthermore, the left-and-right lane line candidate selection module 651 and the left-and-right lane line position estimation module 652 configuring the lane line position estimation module 150 may be implemented by causing the CPU of the computer to execute a program.

The original image binarization module 621 binarizes the original image into a foreground and a background by separating pixels with luminance value of 200 or more as the foreground when the gradation number of the original image is 256 and other pixels as the background, for example. The Hough transformation module 622 detects straight lines based on the pixels taken as the foreground in the original image by a known Hough transformation, and takes those straight lines as the lane line candidates.

The pixel shifting module 631 shifts each pixel of the synthesized bird's-eye image to a distant section in accordance with the shift amount of the own car from the previous time as shown in FIG. 2. For example, in a case where the lowermost row of the synthesized bird's-eye image of FIG. 2C created from the original image of FIG. 2A is defined to be at a position 1 m from the top end of the image input device 110 and a synthesized bird's-eye image is created in such a manner that each pixel of the synthesized bird's-eye image corresponds to 5 cm by 5 cm of the road surface longitudinally and laterally, each pixel of the synthesized bird's-eye image is shifted far by 10 pixels if the shift amount of the own car is 50 cm. Thereby, an image in a state shown in FIG. 2D can be obtained.

The original image to bird's-eye image transformation module 632 transforms the front region 21 of the original image of FIG. 2B into a bird's-eye image. Note, however, that the range of the front region 21 needs to contain the region in the original image corresponding to the distance range that is equivalent to the shift amount of the own car in the real world. The front region adding module 633 adds the front region 21 of the original image that is transformed into the bird's-eye image by the original image to bird's-eye image transformation module 632 to the blank part 22 of the synthesized bird's-eye image to create the synthesized bird's-eye image shown in FIG. 2E.

FIG. 7 is an image chart for describing the principle of transformation of the original image to the bird's-eye image executed by the original image to bird's-eye image transformation module 632 shown in FIG. 6. The coordinate system of the original image in an image plane 720 picked up by the image input device 110 is defined as xy, and the coordinate system of the real world is defined as XYZ. Transformation from the real world to the original image at the time of pickup is defined as perspective transformation, and it is assumed that factors of other transformations due to distortions and the like of the lens and the like can be ignored. It is also assumed that the X-axis and the x-axis as well as the Y-axis and the y-axis are in parallel to each other, and the road surface 710 forms a flat surface that is vertical to the Y-axis. Distance 730 from the origin of the real world coordinate system to the road surface 710 is defined as H, and distance 740 between the origins of both coordinate systems is defined as f.

In this case, a pixel (xi, yi) within the original image corresponding to a point (Xi, H, Xi) on the road surface can be expressed as following Expression 1.

$$\begin{cases} x_i = f \dfrac{X_i}{Z_i} \\ y_i = f \dfrac{H}{Z_i} \end{cases} \quad \text{[Expression 1]}$$

The bird's-eye image is an image when a road surface is viewed with downward eyesight towards the vertical direction in the real world. Transformation of the original image into the bird's-eye image can be achieved by changing the luminance of each pixel in the bird's-eye image to the luminance of the corresponding pixels shown with Expression 1 within the original image. Therefore, the image obtained by transforming points on the road surface to the pixels within the original image with Expression 1 can be considered an image in which the real world coordinates on the road surface are quantized with an appropriate interval such as 5 cm×5 cm longitudinally and laterally.

When there is a transformation factor other than the perspective transformation in the image pickup system, e.g., distortion of the lens or oblique shift between the road surface 710 and the x-axis, the original image can also be transformed into a bird's-eye image through correcting the image by using, instead of Expression 1, a transformation formula which takes those transformation factors into consideration. This is a method that can be employed arbitrarily by those skilled in the art, so that detailed explanations thereof are omitted.

The lane line transformation module 641 transforms the position of the lane line candidate to the position within the synthesized bird's-eye image in the manner described above. The lane line position within synthesized bird's-eye image calculation module 642 calculates the detailed position of the lane line candidate within the synthesized bird's-eye image. The pixel on lane line verification module 643 verifies whether or not each lane line candidate is appropriate as the lane line by using the information of the synthesized bird's-eye image.

FIG. 8 is a conceptual illustration showing the calculation of the position of the lane line candidate executed by the lane line position within synthesized bird's-eye image calculation module 642 shown in FIG. 6. An original-image lane line candidate position 820 is a position of a lane line candidate in a synthesized bird's-eye image 810 that is transformed by the lane line position transformation module 641. The lane line position within synthesized bird's-eye image calculation module 642 expresses the synthesized bird's-eye image lane line candidate position within the synthesized bird's-eye image by taking the original-image lane line candidate position 820 as a front piece of the synthesized bird's-eye image and taking the angle to be within a lane line angle range 830.

For determining the angle, it is determined as the angle at which the sum of the pixel values at the synthesized bird's-eye image lane line candidate position or the sum of the pixel values within the synthesized bird's-eye image in the surroundings thereof becomes the maximum. For example, the lane line angle range 830 is defined as ±30 degrees, and the sum of the pixel values at the synthesized bird's-eye image lane line candidate position and the sum of the pixel values within the synthesized bird's-eye image in the surroundings thereof, e.g., the range of 20 cm each on the left and tight sides with respect to the center line of the synthesized bird's-eye image lane line candidate position when the angle is changed by 1-degree pitch, are calculated, respectively, and the angle at which the sum of the pixel values becomes the maximum is selected.

Note here that the evaluation value when determining the synthesized bird's-eye image lane line candidate position is not limited only to the sum of the pixel values. Any values that express some kind of likeliness as being the lane line regarding the layout of the pixels at the synthesized bird's-eye image lane line candidate position or in the surroundings thereof may be used.

The pixel on lane line verification module 643 verifies whether or not each lane line candidate is appropriate as the lane line based on the pixels at the synthesized bird's-eye image lane line candidate position or in the surroundings thereof. As the evaluation value, the sums of the pixel values used for determining the synthesized bird's-eye image lane line candidate position calculated by the lane line position within synthesized bird's-eye image calculation module 642 can be used, for example.

That is, when the sum of the pixel values is equal to or larger than a threshold value set in advance, each target lane line candidate is considered as appropriate for the lane line, thereby passing the verification. Note here that the evaluation value for verification is not limited only to the sum of the pixel values. Any values that express some kind of likeliness as being the lane line regarding the layout of the pixels at synthesized bird's-eye image lane line candidate position or in the surroundings thereof may be used. Further, evaluation values different from the evaluation values calculated by the lane line position within synthesized bird's-eye image calculation module 642 may be used as well.

Regarding the left and right lane lines of the own car lane, the left-and-right lane line candidate selection module 651 selects the most appropriate lane line candidates for each of the left and right lane lines from the lane line candidates that have passed the verifications executed by the pixel on lane line verification module 643. As the basis for selection, for example, the left and right lane line positions themselves at the previous time or those closest to the predicted positions may be selected. Alternatively, it is also possible to select the candidates with the highest evaluation values for the verification within a range close to the positions of the left and right lane lines, e.g., within 1 m at the previous time. Further, those bases may be used in combinations.

The left-and-right lane line position estimation module 652 estimates the positions of the lane line candidates selected respectively for the left and right lane lines and the positions of the left and right lane lines at the current time from the positions of the left and right lane lines at the previous time, etc. This estimation may be executed by taking the positions of the lane line candidates selected respectively for the left and right lane lines directly as the positions of the left and right lane lines at the current time. Further, for the positions of the left and right lane lines, a time-series filtering method such as a method using a Kalman filter or the like may be employed.

FIG. 9 is a flowchart showing more detailed actions of the lane recognition device 10 shown in FIG. 1 and FIG. 6. Same reference numerals are applied to the same actions as those shown in a flowchart of FIG. 3. When the action shown in FIG. 3 is divided into a plurality of steps in FIG. 9, a sub-numeral is further added to the reference numeral of FIG. 3. For example, when step S2002 of FIG. 3 is divided into two steps in FIG. 9, each of the steps is expressed as step S2002a and step S2002b.

When the processing is started, first, the image input device 110 inputs original images to be the targets of lane line detection (step S2001). Then, the original image binarization module 621 binarizes the original image to classify each pixel into the foreground and the background (step S2002a). Subsequently, straight lines are detected to be the lane line candidates through executing the Hough transformation by having the pixels of the foreground classified in step S2002a by the Hough transformation module 622 as feature points (step S2002b).

The pixel shifting module 631 shifts the pixels of the synthesized bird's-eye image at the previous time in accordance with the shift amount of the own car from the previous time to create the blank part 22 in the bottom part (step S2003a). The original image to bird's-eye image transformation module 632 transforms the front part 21 of the original image into a bird's-eye image (step S2003b). The front region adding module 633 adds the original image front part 21 that has been transformed to the bird's-eye image to the blank part 22 in the bottom part of the bird's-eye image (step S2003c).

Further, following steps S2005a-2007 are repeated while there still remains an unverified lane line candidate, until there is no more unverified lane line (step S2004). In step S2005a, the lane line position transformation module 641 transforms the verification-target lane line candidate position of the original image to the front piece position of the synthesized bird's-eye image. In step S2005b, the lane line position within synthesized bird's-eye image calculation module 642 calculates the angle of the verification-target lane line position within the synthesized bird's-eye image to obtain the lane line candidate position within the synthesized bird's-eye image.

In step S2005c, the pixel on lane line verification module 643 calculates a verification evaluation value showing whether or not the verification-target lane line candidate is appropriate as the lane line. In step S2006, the verification evaluation value is compared with a threshold value that is set in advance. When the verification evaluation value is equal to or more than the threshold value, the procedure is advanced to step S2007. When it is smaller than the threshold value, the procedure is returned to step S2004. In step S2006, the verification-target lane line candidate is added to the verification-passed candidates.

Further, the left-and-right lane line candidate selection module 651 selects the most appropriate lane line candidates respectively for the left and right lane lines from the verification-passed candidates (step S2008a). Subsequently, the left-and-right lane line position estimation module 652 estimates the positions of the left and right lane lines at the current time based on the selected lane line candidates (step S2008b). At last, the lane line position output module 160 outputs the lane line positions estimated in step S2008 (step S2009).

Second Exemplary Embodiment

FIG. 10 is a block diagram showing the fundamental structure of a lane recognition device 11 according to a second exemplary embodiment of the invention. The lane recognition device 11 is configured with a control unit 1000 and an image input device 110. The control unit 1000 is a main part of a computer device that is formed with a CPU, a RAM, an OS, and the like, and executes each of the functions such as a bird's-eye image creation module 1020, a synthesized bird's-eye image creation module 1030, a second synthesized bird's-eye image creation module 1040, a lane line candidate detection module 1050, a lane line position estimation module 1060, and a lane line position output module 160.

The image input device 110 is a device such as a camera which is the same as that of the first exemplary embodiment of the invention. The bird's-eye image creation module 120 creates a bird's-eye image from an original image of current time in a real world range that is set in advance such as a range of 1 m to 8 m away from the own car to the front and rear sides and 4 m away to the left and right sides, respectively, with a preset precision of 5 cm by 5 cm longitudinally and laterally, for example.

The synthesized bird's-eye image creation module 1030 creates a bird's-eye image synthesized based on original images that are picked up at a plurality of different times. The second bird's-eye image creation module 1040 creates a second synthesized bird's-eye image based on the bird's-eye image and the synthesized bird's-eye image.

The lane line candidate detection module 1050 detects the position of the line to be a candidate for the lane line from the second synthesized birds-eye image. The lane line position estimation module 1060 estimates the current-time position of the lane line based on the position of the lane line candidate. The lane line position output module 160 outputs the lane line position of the current time estimated by the lane line position estimation module 1060 as in the case of the first exemplary embodiment.

The second synthesized bird's-eye image herein is a bird's-eye image created anew from the bird's-eye image and the synthesized bird's-eye image, and it is created to eliminate the noises generated in each of the bird's-eye image and the synthesized bird's-eye image. As described above, the synthesized bird's-eye image does not contain a noise in a far part 413 which is considered to be contained greatly in the bird's-eye image. Further, the bird's-eye image does not contain the white-line noise 422 that may be caused due to the foreign matter 412 and the like contained in the synthesized bird's-eye image. Therefore, it is possible to create the second synthesized bird's-eye image to offset such noises with the bird's-eye image and the synthesized bird's-eye image mutually.

Instead of the second synthesized bird's-eye image of this exemplary embodiment, a processed image to which processing such as filtering is applied may also be used.

The second bird's-eye image creation module 1040 which creates the second synthesized bird's-eye image whose pixel values of the pixels at the same positions are the values calculated based on the pixel values of the pixels at the same positions of the two images or the pixels of the surroundings thereof out of the original image or the bird's-eye image created from the original image and the synthesized bird's-eye image, and the lane line candidate detection module 1050 which detects the lane line candidate from the second synthesized bird's-eye image configure a lane line candidate extraction module which detects the lane line candidate by using the information of the original image or the bird's-eye image created from the original image and the synthesized bird's-eye image.

Further, the bird's-eye image creation module 1020, the synthesized bird's-eye image creation module 1030, the second synthesized bird's-eye image creation module 1040, the lane line candidate detection module 1050, the lane line position estimation module 1060, and the lane line position output module 160 may be implemented by causing a CPU of a computer to execute a program.

FIG. 11 is a flowchart which illustrates the outline of the processing executed by the lane recognition device 11 shown in FIG. 10. First, the image input device 110 inputs an original image to be the target of lane line detection (step S2101). Then, the bird's-eye image creation module 1020 creates a bird's-eye image from the original image (step S2102), and the synthesized bird's-eye image creation module 1030 creates a synthesized bird's-eye image (step S2103).

Further, the second bird's-eye image creation module 1040 creates a second synthesized bird's-eye image (step S2104), the lane line candidate detection module 1050 detects the lane line candidate from the second bird's-eye image (step S2105), and the lane line position estimation module 1060 estimates the lane line position based on the position of the lane line candidate (step S2106). At last, the lane line position output module 160 outputs the lane line position estimated in step S2106 (step S2107).

The exemplary embodiment is structured to detect the lane line candidate from the second synthesized bird's-eye image created by eliminating the noises generated respectively in the bird's-eye image and the synthesized bird's-eye image, so that the lane line can be recognized with high precision by suppressing the influences of the noises.

In the lane recognition device 11 shown in FIG. 1, a camera 510 attached to the rear part of the own car 520 in the manner described in FIG. 5 functions as the image input device 110.

FIG. 12 is a block diagram showing more detailed structures of the synthesized bird's-eye image creation module 1030, the lane line candidate detection module 1050, and the lane line position estimation module 1060 shown in FIG. 10. The synthesized bird's-eye image creation module 1030 includes a pixel shifting module 1231, an original image to bird's-eye image transformation module 1232, and a front region adding module 1233. The lane line candidate detection module 1050 includes a second synthesized bird's-eye image binarization module 1251 and a Hough transformation module 1252. The lane line position estimation module 1060 includes a left-and-right lane line candidate selection module 1261 and a left-and-right lane line position estimation module 1262. The pixel shifting module 1231, the original image to bird's-eye image transformation module 1232, and the front region adding module 1233 configuring the synthesized bird's-eye image creation module 1030 may be implemented by causing a CPU of a computer to execute a program. Further, the second synthesized bird's-eye image binarization module 1251 and the Hough transformation module 1252 configuring the lane line candidate detection module 1050 may be implemented by causing the CPU of the computer to execute a program. Furthermore, the left-and-right lane line candidate selection module 1261 and the left-and-right lane line position estimation module 1262 configuring the lane line position estimation module 1060 may be implemented by causing the CPU of the computer to execute a program.

The pixel shifting module 1231, the original image to bird's-eye image transformation module 1232, and the front region adding module 1233 are the same as the pixel shifting module 631, the original image to bird's-eye image transformation module 632, and the front region adding module 633 or the first exemplary embodiment of the invention shown in FIG. 6, respectively. Therefore, detailed explanations thereof are omitted.

The second synthesized bird's-eye image creation module 1240 creates a second synthesized bird's-eye image based on the bird's-eye image and the synthesized bird's eye image. Creation of the second bird's-eye image can be done in a following manner, for example. A second synthesized bird's-eye image is created from the bird's-eye image and the synthesized bird's-eye image by the original image to bird's-eye image transformation module 1220 and the synthesized bird's-eye image creation module 1230 in the same real world range that is set in advance such as a range of 1 m to 8 m away from the own car to the front and rear sides and 4 m away to the left and right sides, respectively, with a precision of 5 cm by 5 cm longitudinally and laterally, for example.

At that time, the second synthesized bird's-eye image is also created to be in the same real world range and same precision, and the second synthesized bird's-eye image creation module 1240 selects darker values between the pixel values of the corresponding bird's-eye image and synthesized bird's-eye image for each pixel value of the second synthesized bird's-eye image. This makes it possible to mutually offset the noises of high luminance which appear separately in the bird's-eye image and the synthesized bird's-eye image and are likely to be misjudged as the lane lines, so that a bird's-eye image with less noise can be acquired as the second synthesized bird's-eye image.

The method for creating the second bird's-eye image is not limited only to the one described above but any method can be employed as long as it is possible to offset the noises which appear separately in the bird's-eye image and the synthesized bird's-eye image and are likely to be misjudged as the lane lines for making it possible to acquire the bird's-eye image with less noise as the second synthesized bird's-eye image.

The second synthesized bird's-eye image binarization module 1251 binarizes the second synthesized bird's-eye image into a foreground and a background by separating pixels with luminance value of 200 or more as the foreground when the gradation number of the second synthesized bird's-eye image is 256 and other pixels as the background, for example. The Hough transformation module 1252 detects straight lines based on the pixels taken as the foreground in the second synthesized bird's-eye image by a known Hough transformation, and takes those straight lines as the lane line candidates.

Regarding the left and right lane lines of the own car lane, the left-and-right lane line candidate selection module 1261 selects the most appropriate lane line candidates for each of the left and right lane lines from the lane line candidates detected by the lane line candidate detection module 1250. The basis for selection and the method thereof are the same as those of the left-and-right lane line candidate selection module 651 of the first exemplary embodiment of the invention shown in FIG. 6, so that detailed explanations thereof are omitted.

Further, the left-and-right lane line position estimation module 1262 can be structured to execute the same actions as those of the left-and-right lane line position estimation module 652 of the first exemplary embodiment of the invention shown in FIG. 6, so that detailed explanations thereof are omitted.

FIG. 13 is a flowchart showing more detailed actions of the lane recognition device 11 shown in FIG. 10 and FIG. 12. Same reference numerals are applied to the same actions as those shown in the flowchart of FIG. 11. When the action shown in FIG. 11 is divided into a plurality of steps in FIG. 13, a sub-numeral is further added to the reference numeral of FIG. 11 as in the case of the detailed flowchart in FIG. 9 according to the first exemplary embodiment of the invention.

First, the image input device 110 inputs an original image to be the target of lane line detection (step S2101). Then, the bird's-eye image creation module 1020 creates a bird's-eye image from the original image (step S2102).

The pixel shifting module 1231 shifts the pixels of the synthesized bird's-eye image at the previous time (step S2103*a*), the original image to bird's-eye image transformation module 1232 transforms the front part of the original image into a bird's-eye image (step S2103*b*), and the front region adding module 1233 adds the original image front part 21 that has been transformed to the bird's-eye image to the blank part 22 in the bottom part of the bird's-eye image (step S2103*c*).

Further, the second bird's-eye image creation module 1240 creates a second synthesized bird's-eye image from the bird's-eye image and the synthesized bird's-eye image (step S2104). When the second synthesized bird's-eye image binarization module 1251 binarizes the second synthesized bird's-eye image to classify each pixel of the second synthesized bird's-eye image into the foreground and the background (step S2105*a*), the Hough transformation module 1252 detects straight lines to be the lane line candidates by having the pixels of the foreground as feature points (step S2105*b*). Further, the left- and right lane line candidate selection module 1261 selects the most appropriate lane line candidates respectively for the left and right lane lines from the lane line candidates (step S2105*c*).

Furthermore, the left-and-right lane line position estimation module 1262 estimates the positions of the left and right lane lines at the current time (step S2106). At last, the lane line position output module 160 outputs the estimated positions of the left and right lane line positions (step S2107).

Third Exemplary Embodiment

FIG. 14 is a block diagram showing the fundamental structure of a lane recognition device 12 according to a third exemplary embodiment of the invention. The lane recognition device 12 is configured with a control unit 1400 and an image input device 110. The control unit 1400 is a main part of a computer device that is formed with a CPU, a RAM, an OS, and the like, and executes each of the functions such as a lane line candidate detection module 1420, a synthesized bird's-eye image creation module 1430, a lane line candidate verification module 1440, a lane line position estimation module 1450, a lane line type judgment module 1460, and a lane line position output module 160.

The image input device 110 is a device such as a camera which is the same as that of the first and second exemplary embodiments of the invention. The lane line candidate detection module 1420 detects the position of the line to be the candidate for the lane line from an original image or a bird's-eye image created from the original image. The synthesized bird's-eye image creation module 1430 creates the bird's-eye image that is synthesized based on the original images picked up at a plurality of different times.

The lane line candidate verification module 1440 verifies whether or not the lane line candidate detected by the lane line candidate detection module 1420 is appropriate for the lane line based on information regarding the surroundings of the lane line candidate position within the synthesized bird's-eye image created by the synthesized bird's-eye image creating module 1430.

The lane line position estimation module 1450 estimates the position of the lane line at the current time based on the position of the lane line candidate that is verified as being appropriate for the lane line by the lane line candidate verification module 1440. The lane line type judgment module 1460 judges about the line type of the lane line such as a solid line or a broken line based on the information of the synthesized image, the original image, or the bird's-eye image created from the original image in the surroundings of the position of the lane line estimated by the lane line position estimation module 1450.

The lane line position output module 160 outputs the lane line position of the current time estimated by the lane line estimation module 1450 and the lane line type judged by the lane line type judgment module 1460 as in the cases of the first and second exemplary embodiments of the invention.

As evident from the explanations above, the lane recognition device 12 shown in FIG. 14 can be considered a device obtained by adding the lane line type judgment module 1460 to the lane recognition device 10 according to the first exemplary embodiment of the invention shown in FIG. 1. The lane line candidate detection module 1420, the synthesized bird's-eye image creation module 1430, the lane line candidate verification module 1440, and the lane line position estimation module 1450 are the same as the lane line candidate detection module 120, the synthesized bird's-eye image creation module 130, the lane line candidate verification module 140, and the lane line position estimation module 150 according to the first exemplary embodiment of the invention, respectively.

The lane line candidate detection module 1420 which detects the lane line candidate from the original image, the bird's-eye image created from the original image, or the synthesized bird's-eye image and the lane line detection module 1440 which verifies whether or not the detected lane line candidate is appropriate for the lane line by using the information of the synthesized bird's-eye image, the original image, or the bird's-eye image created from the original image configure a lane line candidate extraction module which detects the lane line candidate by using the information of the original image or the bird's-eye image created from the original image and the synthesized bird's-eye image.

Further, the lane line candidate detection module 1420, the synthesized bird's-eye image creation module 1430, the lane line candidate verification module 1440, the lane line position estimation module 1450, the lane line type judgment module 1460, and the lane line position output module 160 may be implemented by causing a CPU of a computer to execute a program.

FIG. 15 is a flowchart showing the outline of processing executed by the lane recognition device 12 shown in FIG. 14. When the processing is started, first, the image input device 110 inputs original images to be the targets of lane line detection (step S2201). Then, the lane line candidate detection module 1420 detects a candidate of lane line (step S2202), and the synthesized bird's-eye image creation module 1430 creates a synthesized bird's-eye image (step S2203).

Further, following steps S2205-2207 are repeated while there still remains an unverified lane line candidate, until there is no more unverified lane line (step S2204). In step S2205, the lane line candidate verification module 1440 verifies whether or not the verification-target lane line is appropriate as a lane line from the information regarding the surroundings of the verification-target lane line candidate within the synthesized bird's-eye image. Details of the "verification" in step S2205 will be described later.

In step S2206, the lane line candidate verification module 1440 adds the verification-target lane line candidate to a verification-succeeded candidate when the candidate has passed the verification (step S2207). When unsuccessful, the procedure is returned to step S2204. Further, the lane line position estimation module 1450 estimates the lane line position at the current time based on the position of the lane line candidate that has passed the verification (step S2208), and the lane line type judgment module 1460 judges the line type of the lane line based on the estimated lane line position (step S2209). At last, the lane line position output module 160 outputs the lane line position and the line type estimated in step A8 (step S2210).

As evident from the explanations above, steps S2201-2208 of the flowchart shown in FIG. 15 are the same as steps S2001-2008 of the flowchart according to the first exemplary embodiment of the invention shown in FIG. 3. It can be said that step S2209 for judging the line type of the lane line is added thereafter.

The exemplary embodiment is not only capable of recognizing the lane line with high precision as in the case of the first exemplary embodiment of the invention but also capable of judging the lane line type with high precision based on the lane line position.

FIG. 16 is a block diagram showing more detailed structure of the lane line type judgment module 1460 shown in FIG. 14. The lane line type judgment module 1460 includes a synthesized bird's-eye image binarization module 1661, a connected foreground length on lane line calculation module 1662, and a solid-line/broken-line judgment module 1663. The detailed structures of the lane line candidate detection module 1420, the synthesized bird's-eye image creation module 1430, the lane line candidate verification module 1440, and the lane line position estimation module 1450 shown in FIG. 14 are the same as the lane line candidate detection module 120, the synthesized bird's-eye image creation module 130, the lane line candidate verification module 140, and the lane line position estimation module 150 shown in FIG. 6, respectively, so that explanations thereof are omitted. Further, the synthesized bird's-eye image binarization module 1661, the connected foreground length on lane line calculation module 1662, and the solid-line/broken-line judgment module 1663 configuring the lane line type judgment module 1460 may be implemented by causing a CPU of a computer to execute a program.

The synthesized bird's-eye image binarization module 1661 binarizes the synthesized bird's-eye image acquired in the steps up to step S2208 into a foreground and a background by separating pixels with luminance value of 200 or more as the foreground when the gradation number of the synthesized bird's-eye image is 256 and other pixels as the background, for example.

The connected foreground length on lane line calculation module 1662 sections the foreground pixels of the synthesized bird's-eye image existed on the left and right lane lines whose positions are estimated by the left-and-right lane line position estimation module 1652 to a connected sets in a sense of the vicinity of 8, for example, and calculates the maximum pixel number in those connected sets as the connected foreground length on the lane line.

The solid-line/broken-line judgment module 1663 judges that the lane line is a solid line when the connected foreground length on the lane line is equal to or more than a preset threshold value, e.g., 200 pixels or more, and judges that the lane line is a broken line when it is smaller than the threshold value.

FIG. 17 is a flowchart showing more detailed actions of the lane recognition device 12 shown in FIG. 14 and FIG. 16. As described above, steps S2201-2208 are the same as steps S2001-2008 of the flowchart according to the first exemplary embodiment of the invention shown in FIG. 3. Thus, detailed explanations thereof are omitted.

Further, same reference numerals are applied to the same actions as those shown in a flowchart of FIG. 15. When the action shown in FIG. 15 is divided into a plurality of steps in FIG. 17, a sub-numeral is further added to the reference numeral of FIG. 15 as in the case of the first and second exemplary embodiments of the invention.

The synthesized bird's-eye image binarization module 1661 binarizes the synthesized bird's-eye image acquired in the steps up to step S2208 to classify each pixel into the foreground and the background (step S2209a). Subsequently, the connected foreground length on lane line calculation module 1662 calculates the maximum pixel number in the connected sets of the foreground on the left and right lane lines as the connected foreground length on the lane line (step S2209b).

Further, the solid-line/broken-line judgment module 1663 compares the connected foreground length on the lane line with the preset threshold value, and judges that the lane line is a solid line when the connected foreground length on the lane line is equal to or more than the preset threshold while judging that the lane line is a broken line when it is smaller than the threshold value (step S2209c). At last, the lane line position output module 160 outputs the estimated lane line positions and the judged lane line types (step S2210).

The lane recognition device 12 shown in FIG. 14 is formed by adding the lane line type judgment module 1460 to the lane recognition device 10 according to the first exemplary embodiment of the invention. Similarly, the lane line type judgment module 1460 can also be added to the lane recognition device 11 according to the second exemplary embodiment of the invention shown in FIG. 10.

While the present invention has been described by referring to specific embodiments shown in the drawings, the present invention is not limited only to those embodiments shown in the drawings. It is to be understood that any known structures can be employed as long as the effects of the present invention can be achieved therewith.

INDUSTRIAL APPLICABILITY

The present invention can be applied to usages such as estimation of lane line positions from images and judgment on type of the lane lines.

BRIEF DESCRIPTION OF THE DRAWINGS

FIG. 2 is a conceptual illustration showing creation of a synthesized bird's-eye image executed by a synthesized bird's-eye image creation module shown in FIG. 1;

FIG. 19 is a conceptual illustration showing actions of the lane recognition device shown in FIG. 18.

Figure 1:
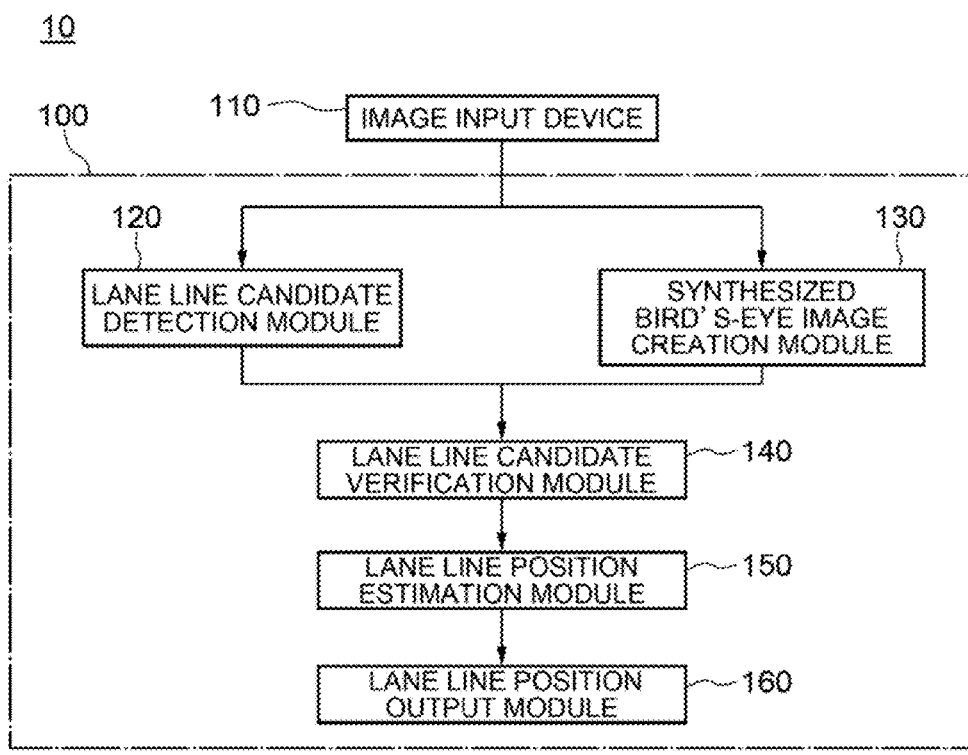
FIG. 1 is a block diagram showing the fundamental structure of a lane recognition device according to a first exemplary embodiment of the invention.
Figure 3:
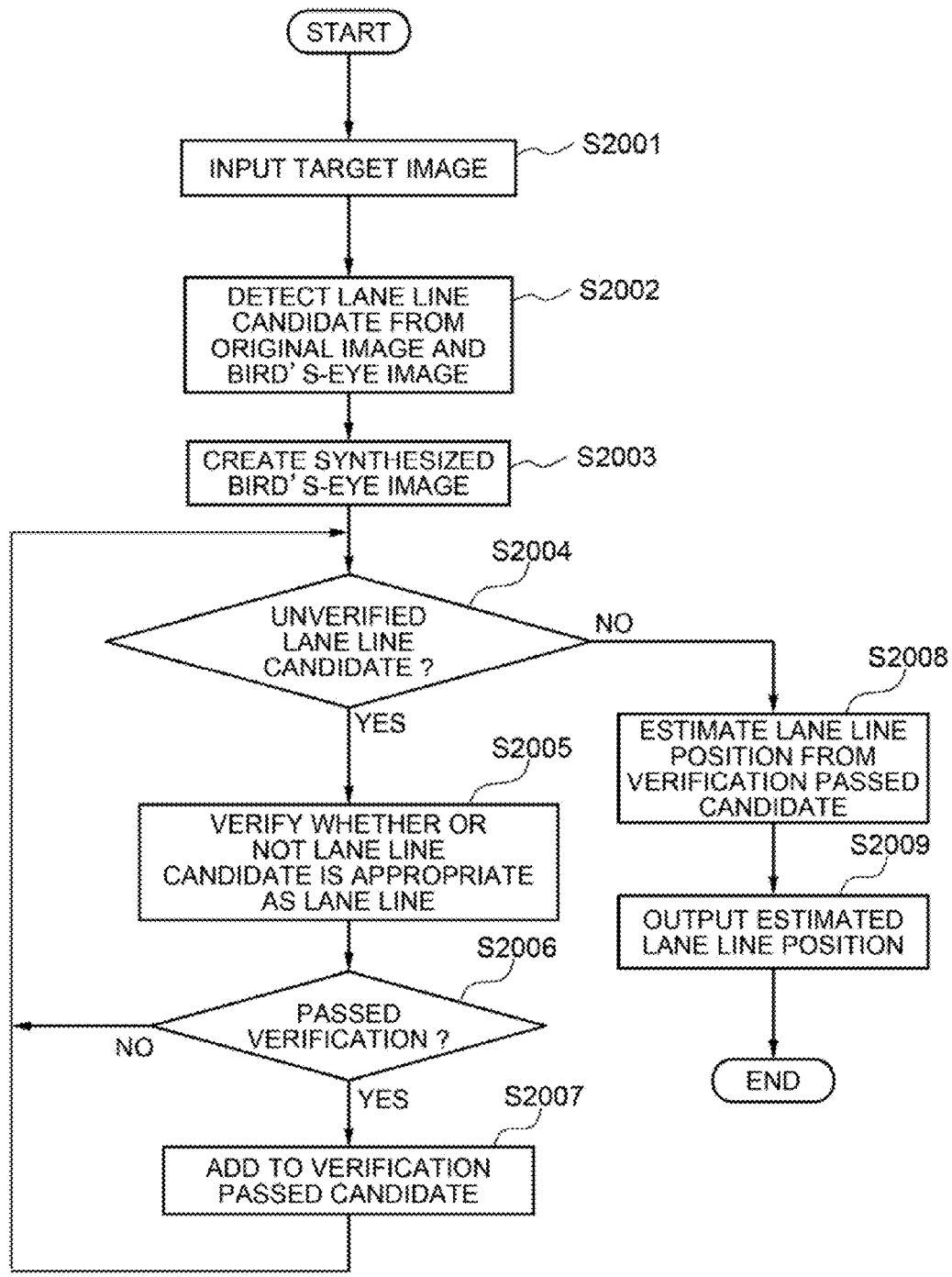
FIG. 3 is a flowchart which illustrates the outline of processing executed by the lane recognition device shown in FIG. 1.
Figure 4B:
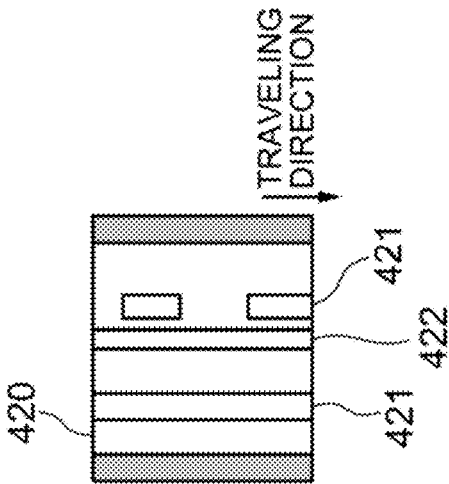
FIG. 4 is a conceptual illustration showing an example of a noise contained in an original image when creating the synthesized bird's-eye image shown in FIG. 2.
Figure 4A:
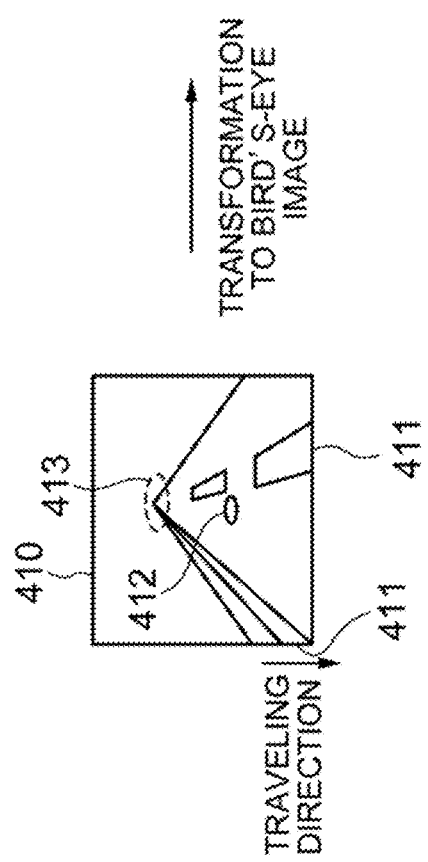
Figure 5:
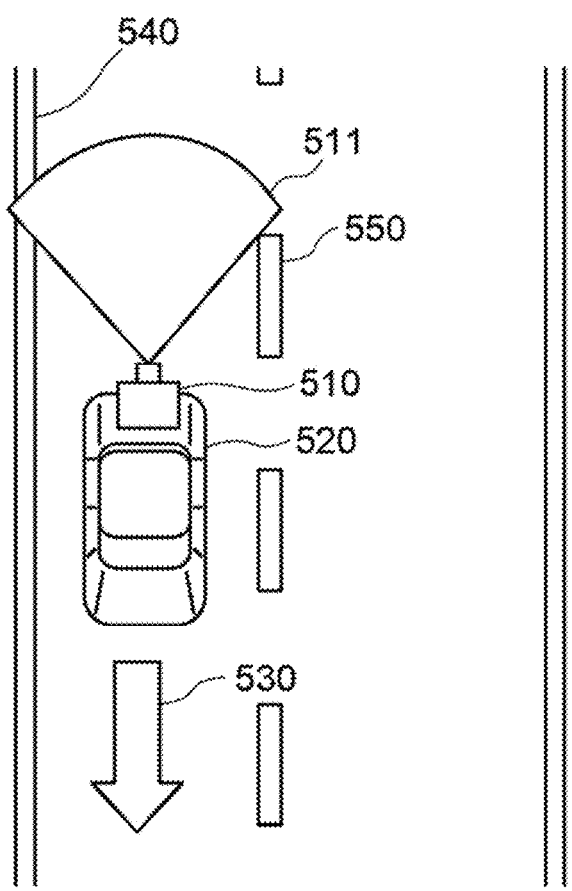
FIG. 5 is a conceptual illustration showing an example where the lane recognition device shown in FIG. 1 is actually loaded to a vehicle.
Figure 6:
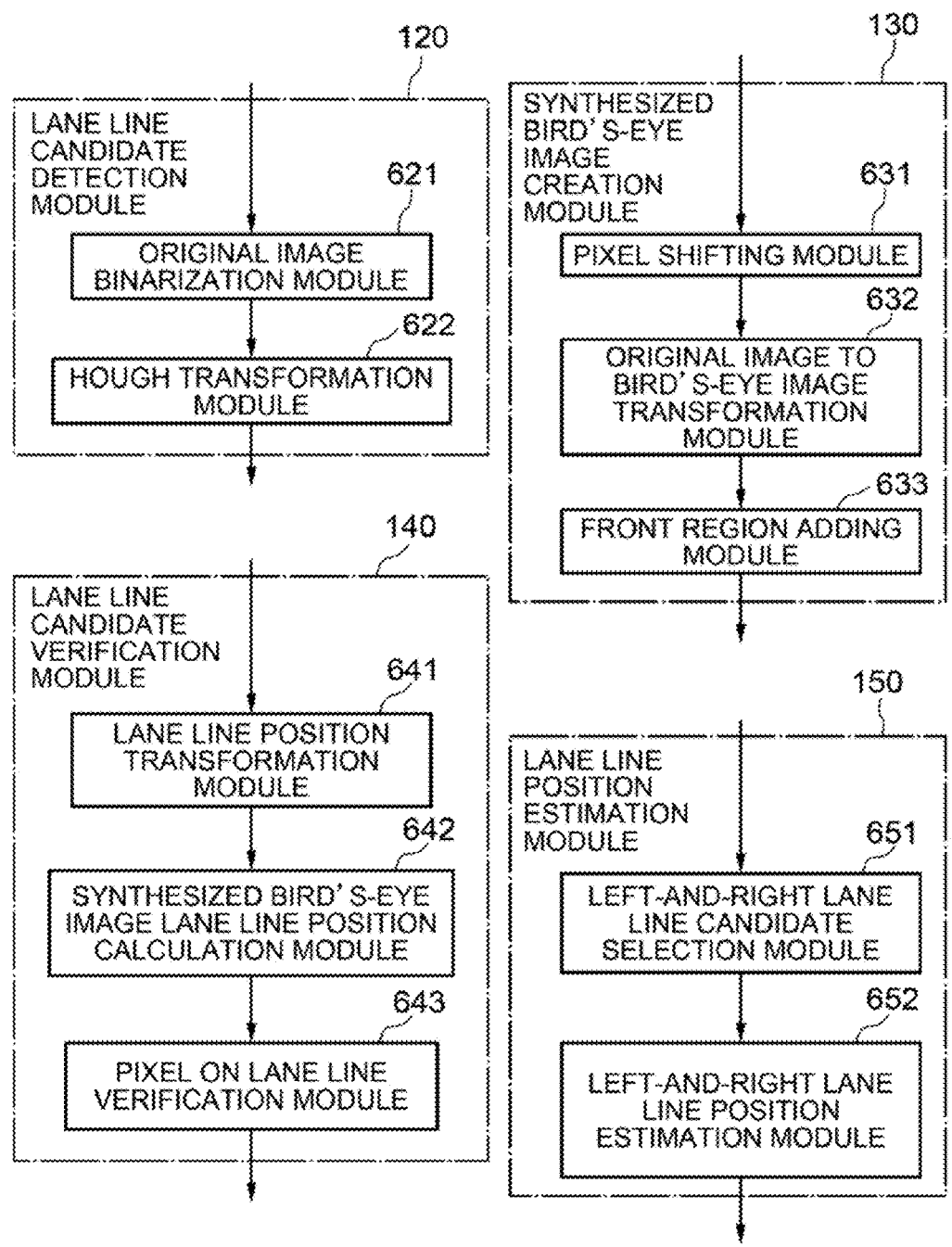
FIG. 6 is a block diagram showing more detailed structures of a lane line candidate detection module, a synthesized bird's-eye image creation module, a lane line candidate verification module, a lane line position estimation module, and a lane line position output module shown in FIG. 1.
Figure 7:
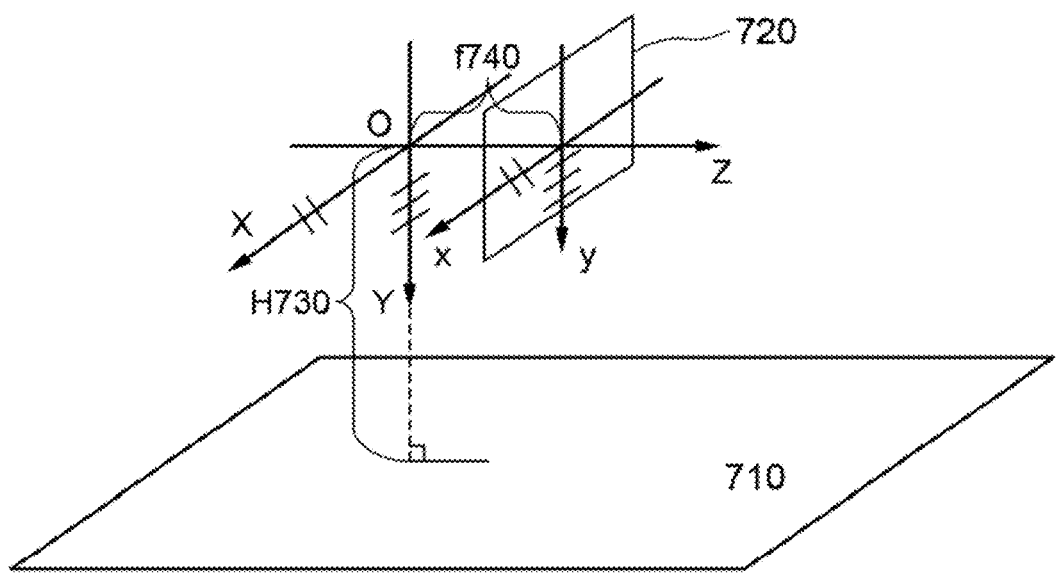
FIG. 7 is an image chart for describing the principle of transforming the original image to the bird's-eye image executed by an original image to bird's-eye image transformation module shown in FIG. 6.
Figure 8:
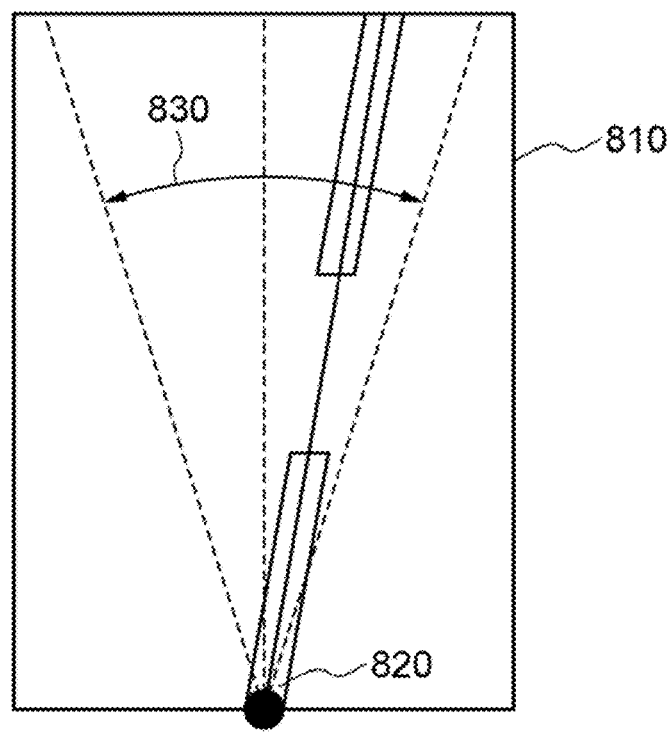
FIG. 8 is a conceptual illustration showing calculation of the position of the lane line candidate executed by a lane line position within synthesized bird's-eye image calculation module shown in FIG. 6.
Figure 9:
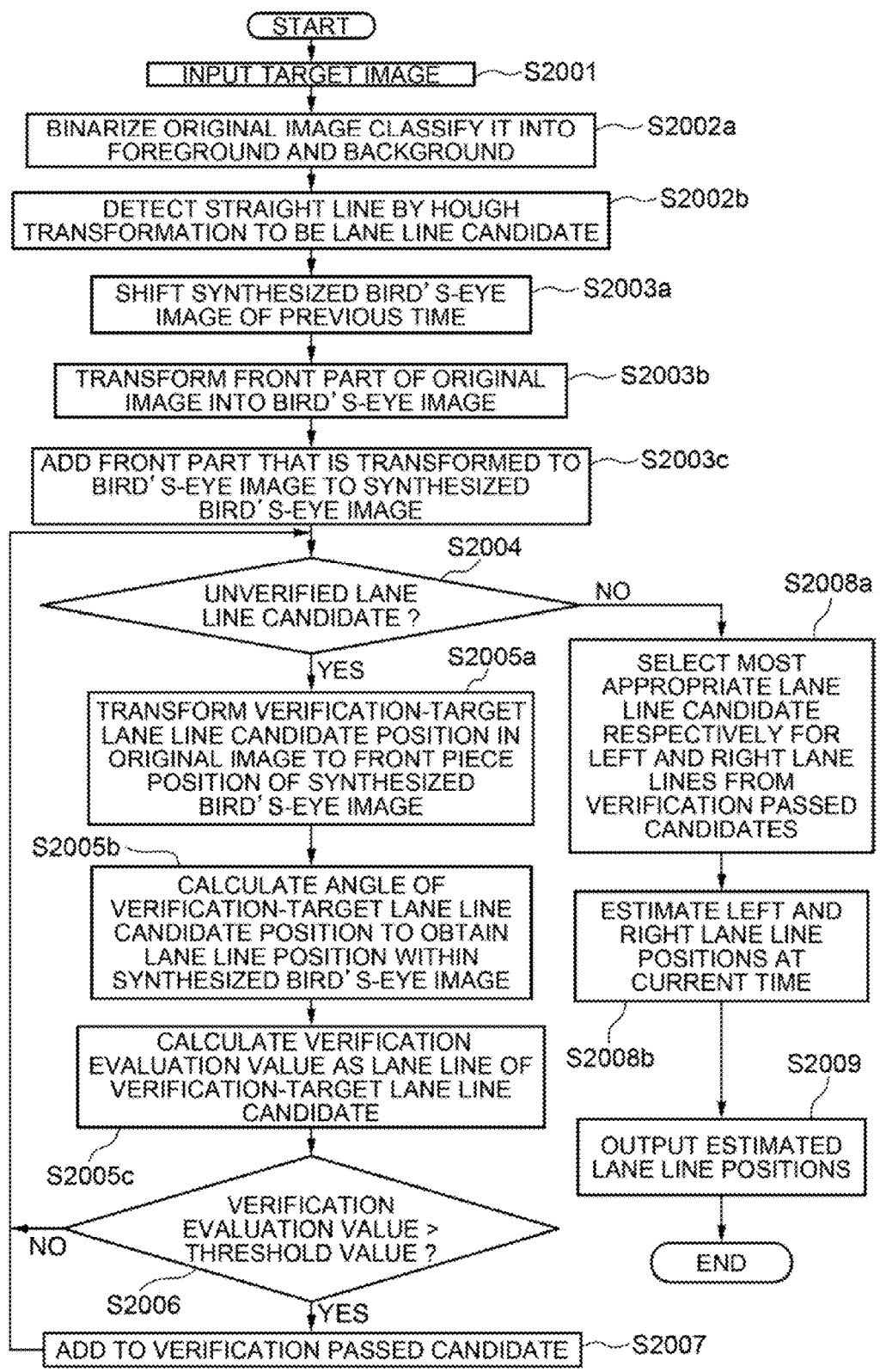
FIG. 9 is a flowchart showing more detailed actions of the lane recognition device shown in FIG. 1 and FIG. 6.
Figure 10:
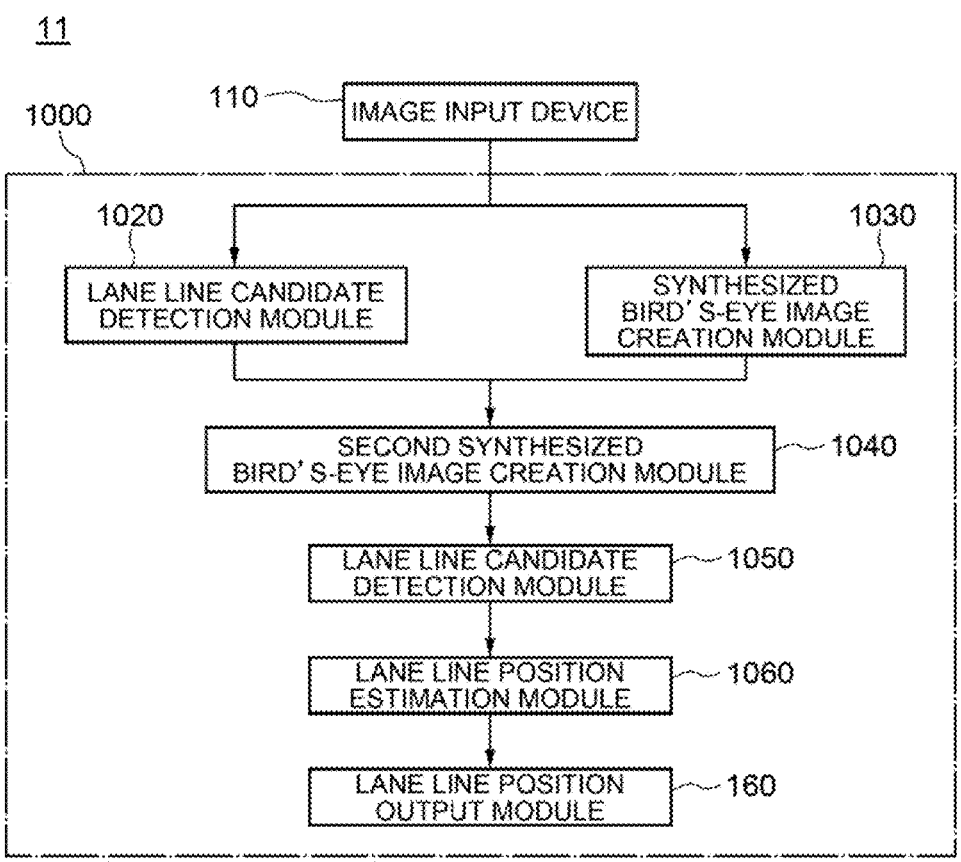
FIG. 10 is a block diagram showing the fundamental structure of a lane recognition device according to a second exemplary embodiment of the invention.
Figure 11:
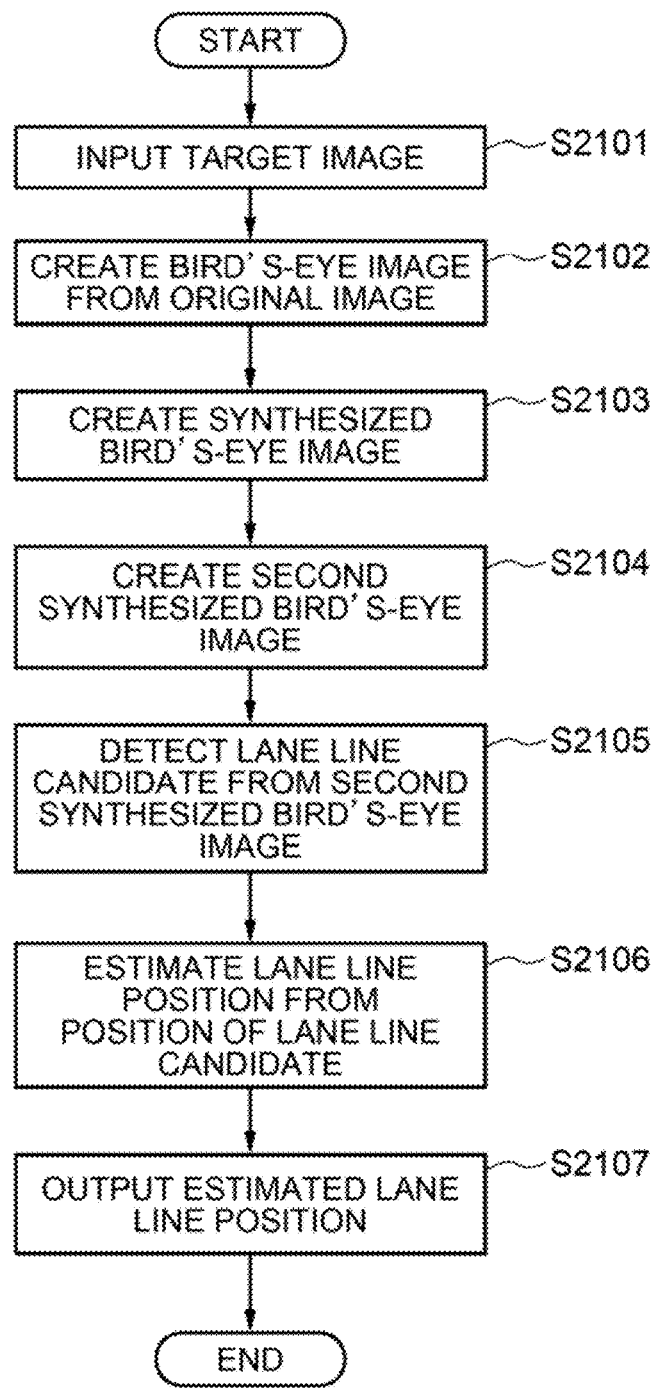
FIG. 11 is a flowchart which illustrates the outline of processing executed by the lane recognition device shown in FIG. 10.
Figure 12:
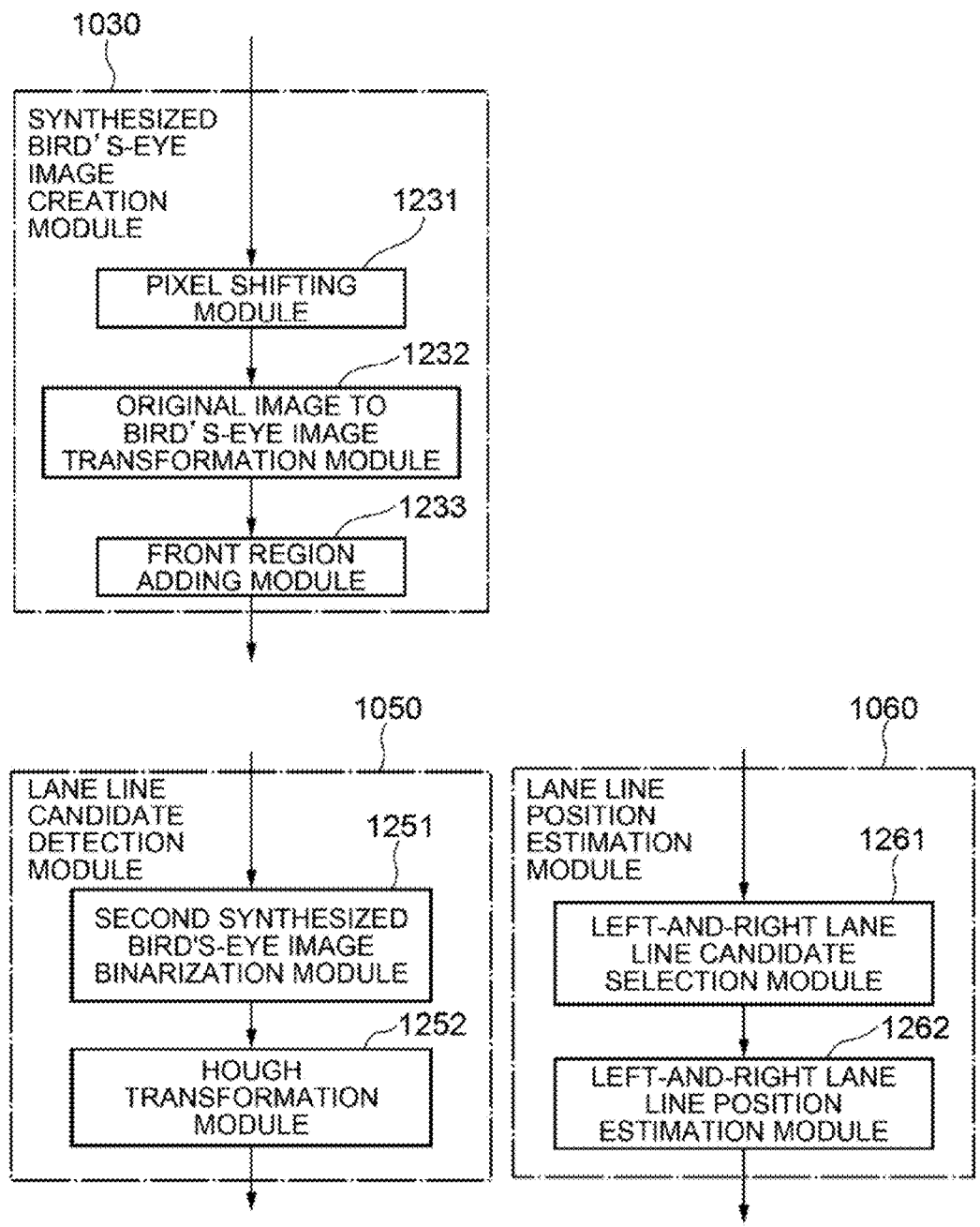
FIG. 12 is a block diagram showing more detailed structures of a synthesized bird's-eye image creation module, a lane line candidate detection module, and a lane line position estimation module shown in FIG. 10.
Figure 13:
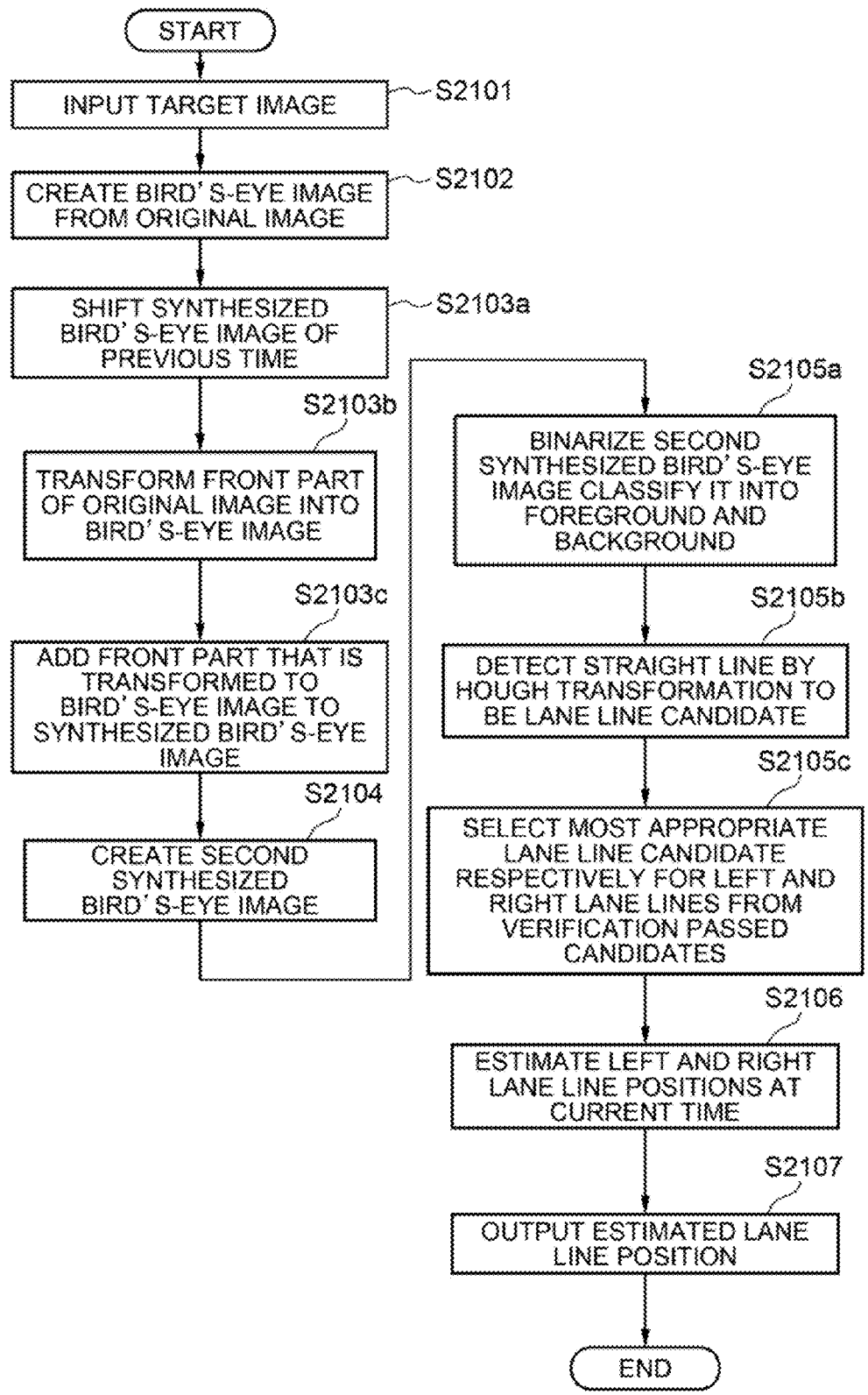
FIG. 13 is a flowchart showing more detailed actions of the lane recognition device shown in FIG. 10 and FIG. 12.
Figure 14:
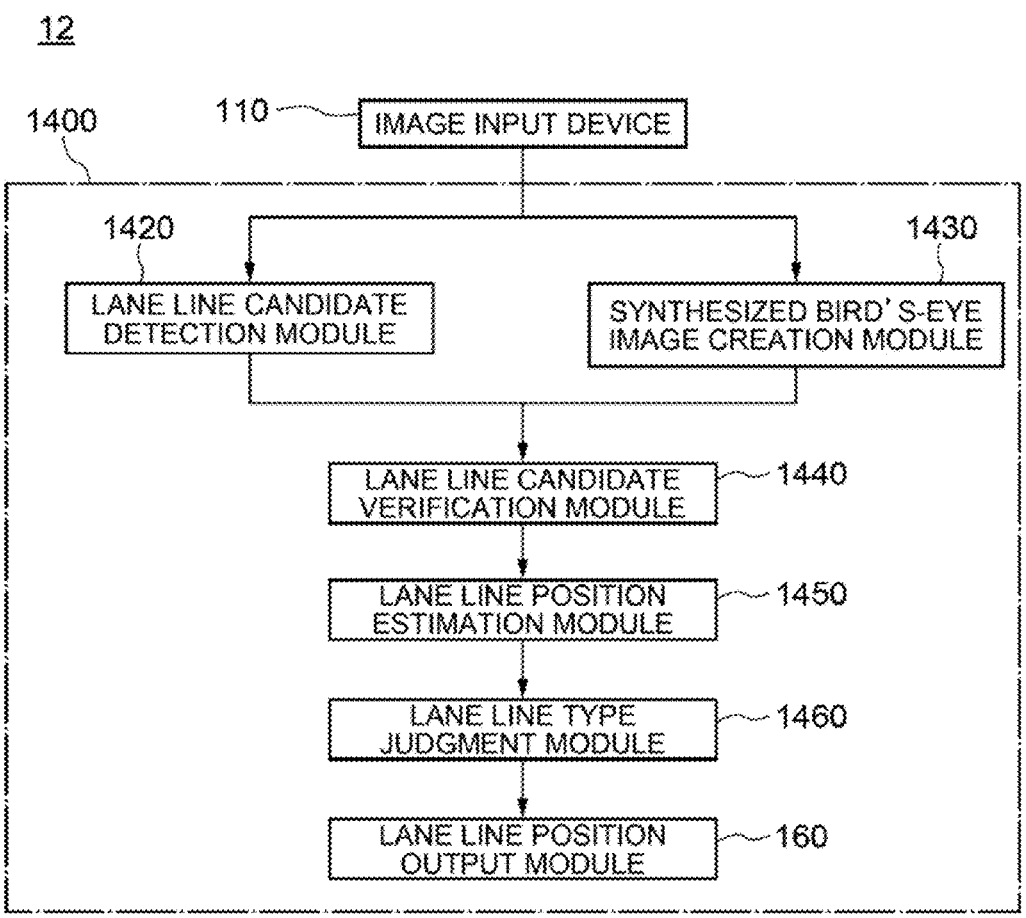
FIG. 14 is a block diagram showing the fundamental structure of a lane recognition device according to a third exemplary embodiment of the invention.
Figure 15:
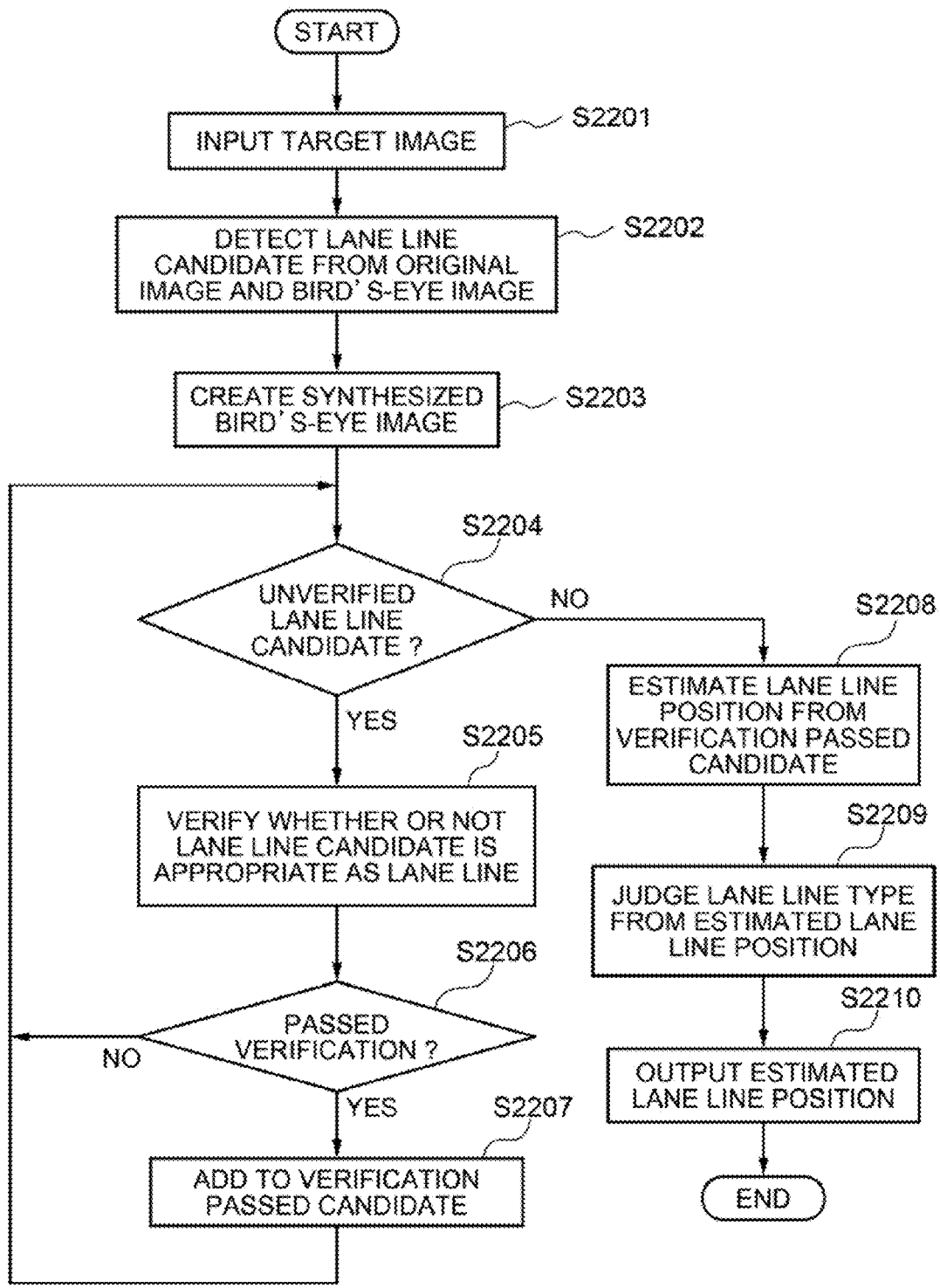
FIG. 15 is a flowchart which illustrates the outline of processing executed by the lane recognition device 12 shown in FIG. 14.
Figure 16:
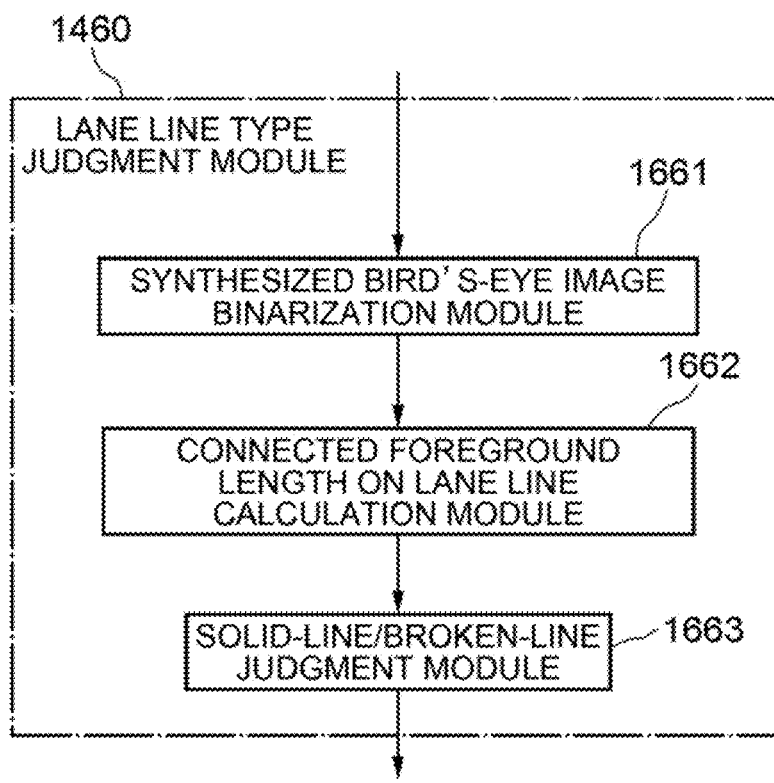
FIG. 16 is a block diagram showing more detailed structures of a lane line type judgment module shown in FIG. 14.
Figure 17:
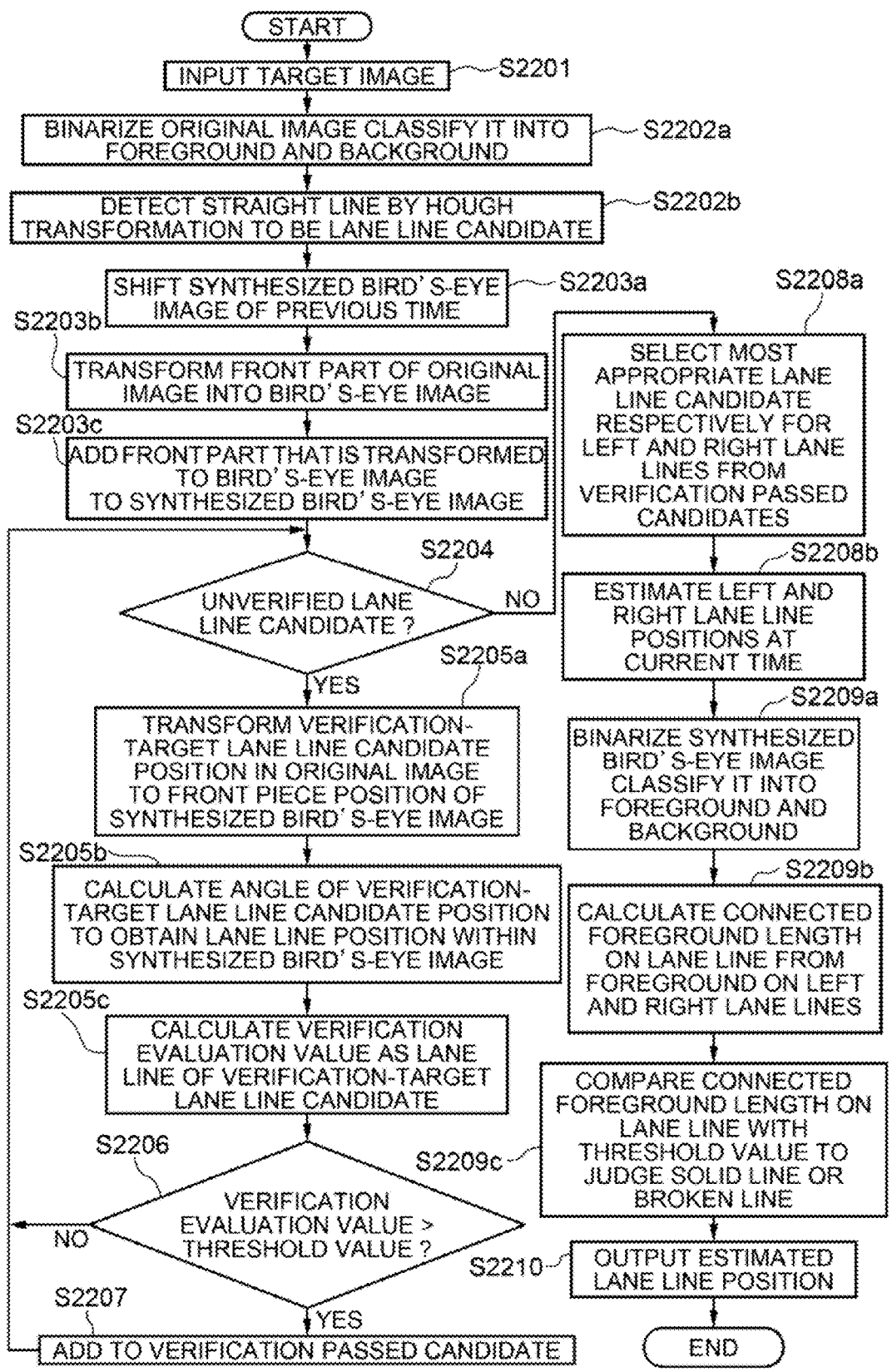
FIG. 17 is a flowchart showing more detailed actions of the lane recognition device shown in FIG. 14 and FIG. 16.
Figure 18:
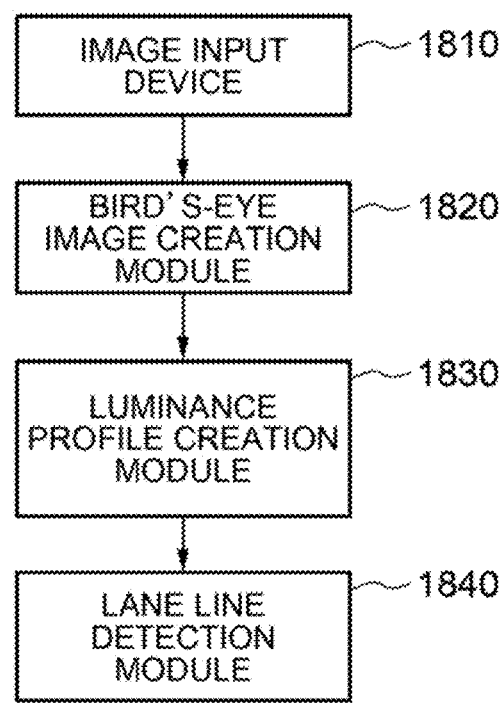
FIG. 18 is a conceptual illustration showing an example of the structure of a widely-used lane recognition device depicted in Patent Document 1.

| REFERENCE NUMERALS | |
|---|---|
| 10, 11, 12 | Lane recognition device |
| 100, 1000, 1400 | Control unit |
| 110 | Image input device |
| 120, 1420 | Lane line candidate detection module |
| 130, 1340 | Synthesized bird's-eye image creation module |
| 140, 1440 | Lane line candidate verification module |
| 150, 1450 | Lane line position estimation module |
| 160 | Lane line position output module |
| 621 | Original image binarization module |
| 622 | Hough transformation module |
| 631 | Pixel shifting module |
| 632 | Original image to bird's-eye image transformation module |
| 633 | Front region adding module |
| 641 | Lane line position transformation module |
| 642 | Lane line position within synthesized bird's-eye image calculation module |
| 643 | Pixel on lane line verification module |
| 651 | Left-and-right lane line candidate selection module |
| 652 | Left-and-right lane line position estimation module |
| 1020 | Bird's-eye image creation module |
| 1030 | Synthesized bird's-eye image creation module |
| 1040 | Second synthesized bird's-eye image creation module |
| 1050 | Lane line candidate detection module |
| 1060 | Lane line position estimation module |
| 1231 | Pixel shifting module |
| 1232 | Original image to bird's-eye image transformation module |
| 1233 | Front region adding module |
| 1251 | Second synthesized bird's-eye image binarization module |
| 1252 | Hough transformation module |
| 1261 | Left-and-right lane line candidate selection module |
| 1262 | Left-and-right lane line position estimation module |
| 1460 | Lane line type judgment module |

| REFERENCE NUMERALS | |
|---|---|
| 1661 | Synthesized bird's-eye image binarization module |
| 1662 | Connected foreground length on lane line calculation module |
| 1663 | Solid-line/broken-line judgment module |

The invention claimed is:

1. A lane recognition system which recognizes a lane based on an image, comprising:

a synthesized bird's-eye image creation module which creates a synthesized bird's-eye image by connecting a plurality of bird's-eye images that are obtained by transforming respective partial regions of original images picked up at a plurality of different times into bird's-eye images;

a lane line candidate extraction module which detects a lane line candidate by using both the synthesized bird's-eye image, and the original images or the bird's-eye images created from the original images;

a lane line position estimation module which estimates a lane line position based on information of the lane line candidate; and a lane line position output module which outputs the estimated lane line position outside the lane recognition system, wherein the lane line candidate extraction module comprises:

a lane line candidate detection module which detects the lane line candidate by using the original images or the bird's-eye images created from the original images or by using the synthesized bird's-eye image; and a lane line verification module which verifies whether or not the detected lane line candidate is appropriate for a lane line by using the synthesized bird's-eye images in a case where the lane line candidate detection module uses the original images or the bird's-eye image created from the original images and by using the original images or the bird's-eye images created from the original images in a case where the lane line candidate detection module uses the synthesized bird's-eye image.

2. The lane recognition system as claimed in claim 1, wherein the lane line extraction module comprises:

a lane line candidate detection module which detects the lane line candidate by using the original images or the bird's-eye images created from the original images or by using the synthesized bird's-eye image; and a lane line verification module which verifies whether or not the detected lane line candidate is appropriate for a lane line by using the synthesized bird's-eye images in a case where the lane line candidate detection module uses the original images or the bird's-eye images created from the original images and by using the original images or the bird's-eye images created from the original images in a case where the lane line candidate detection module uses the synthesized bird's-eye image.

3. The lane recognition system as claimed in claim 1, wherein the lane line candidate extraction module comprises:

a second synthesized bird's-eye image creation module which creates, from the original images or the bird's-eye images created from the original images and the synthesized bird's-eye image, a second synthesized bird's-eye image whose pixel values of pixels at same positions are values calculated based on pixel values of the pixels at the same positions of the two images or pixel values of the pixels of surroundings thereof; and a lane line candidate detection module which detects the lane line candidate from the second synthesized bird's-eye image.

4. The lane recognition system as claimed in claim 1 further comprising a lane line judgment module which judges line type of the lane line from information of the original images, the bird's-eye images created from the original images, the synthesized bird's-eye image, or the second synthesized bird's-eye image.

5. The lane recognition system as claimed in claim 2, wherein the lane line verification module verifies appropriateness of being a lane line based on layout of a white or yellow paint part on the lane line candidate within the synthesized bird's-eye image.

6. The lane recognition system as claimed in claim 5, wherein the lane line detection module decides it as being appropriate for a lane line in a case where there are more than a specific number of pixels that are the white or yellow paint part on the lane line candidate within the synthesized bird's-eye image.

7. The lane recognition system as claimed in claim 1 wherein the second synthesized bird's-eye image creation module selects pixel values with lower luminance out of the corresponding pixels of the bird's-eye images created from the original images and the synthesized bird's-eye image for the pixel values of each pixel in a second synthesized bird's-eye image.

8. The lane recognition system as claimed in claim 1 which is directed to perform lane recognition from an image of a camera loaded on a rear part of an own car.

9. A lane recognition method which recognizes a lane based on an image, comprising:

creating a synthesized bird's-eye image by connecting a plurality of bird's-eye images that are obtained by transforming respective partial regions of original images picked up at a plurality of different times into bird's-eye images;

detecting a lane line candidate by using both the synthesized bird's-eye image, and the original images or the bird's-eye images created from the original images;

estimating a lane line position based on information of the lane line candidate; and outputting the estimated lane line position, wherein detecting the lane line candidate comprises:

detecting the lane line candidate by using the original images or the bird's-eye images created from the original images or by using the synthesized bird's-eye image; and verifying whether or not the detected lane line candidate is appropriate for a lane line by using the synthesized bird's-eye images in a case where detecting the lane line candidate uses the original images or the bird's-eye image created from the original images and by using the original images or the bird's-eye images created from the original images in a case where detecting the lane line candidate uses the synthesized bird's-eye image.

10. The lane recognition method as claimed in claim 9, comprising:

when detecting the lane line candidate, detecting the lane line candidate by using the original images or the bird's- eye images created from the original images or by using the synthesized bird's-eye image; and verifying whether or not the detected lane line candidate is appropriate for a lane line by using the synthesized bird's-eye image in a case where the original images or the bird's-eye images created from the original images are used as the images when detecting the lane line candidate and by using the original images or the bird's-eye images created from the original images in a case where the synthesized bird's-eye image is used as the image when detecting the lane lien candidate.

11. The lane recognition method as claimed in claim 9, comprising:

when detecting the lane line candidate, creating, from the original images or the bird's-eye images created from the original images and the synthesized bird's-eye image, a second synthesized bird's-eye image whose pixel values of pixels at same positions are values calculated based on pixel values of the pixels at the same positions of the two images or pixel values of the pixels of surroundings thereof; and detecting the lane line candidate from the second synthesized bird's-eye image.

12. The lane recognition method as claimed in claim 9 further comprising judging line type of the lane line from information of the original images, the bird's-eye images created from the original images, the synthesized bird's-eye image, or the second synthesized bird's-eye image.

13. The lane recognition method as claimed in claim 10, comprising when detecting the lane line candidate, verifying appropriateness of being a lane line based on layout of a white or yellow paint part on the lane line candidate within the synthesized bird's-eye image.

14. The lane recognition method as claimed in claim 13, comprising when detecting the lane line candidate, deciding it as being appropriate in a case where there are more than a specific number of pixels that are the white or yellow paint part on the lane line candidate within the synthesized bird's-eye image.

15. The lane recognition method as claimed in claim 9 comprising when creating the second synthesized bird's-eye image, selecting pixel values with lower luminance out of the corresponding pixels of the bird's-eye images created from the original images and the synthesized bird's-eye image for the pixel values of each pixel in a second synthesized bird's-eye image.

16. The lane recognition method as claimed in claim 9 which is directed to perform lane recognition from an image of a camera loaded on a rear part of an own car.

17. A non-transitory computer readable recording medium storing a lane recognition program for controlling recognition of a lane based on an image, which causes a computer to execute:

synthesized bird's-eye image creation processing which creates a synthesized bird's-eye image by connecting a plurality of bird's-eye images that are obtained by transforming respective partial regions of original images picked up at a plurality of different times into bird's-eye images;

lane line candidate extraction processing which detects a lane line candidate using both the synthesized bird's-eye image, and the original images or the bird's-eye images created from the original images;

lane line position estimation processing which estimates a lane line position based on information of the lane line candidate; and lane line position output processing which outputs the estimated lane line position outside, wherein the lane line candidate extraction processing comprises:

lane line candidate detection processing which detects the lane line candidate by using the original images or the bird's-eye images created from the original images or by using the synthesized bird's-eye image; and lane line verification processing which verifies whether or not the detected lane line candidate is appropriate for a lane line by using the synthesized bird's-eye images in a case where the lane line candidate detection processing uses the original images or the bird's-eye image created from the original images and by using the original images or the bird's-eye images created from the original images in a case where the lane line candidate detection processing uses the synthesized bird's-eye image.

18. A lane recognition system which recognizes a lane based on an image, comprising:

synthesized bird's-eye image creation means for creating a synthesized bird's-eye image by connecting a plurality of bird's-eye images that are obtained by transforming respective partial regions of original images picked up at a plurality of different times into bird's-eye images;

lane line candidate extraction means for detecting a lane line candidate using both the synthesized bird's-eye image, and the original images or the bird's-eye images created from the original images, and the synthesized bird's-eye image;

lane line position estimation means for estimating a lane line position based on information of the lane line candidate; and lane line position output means which outputs the estimated lane line position outside the lane recognition system, wherein the lane line candidate extraction means comprises:

a lane line candidate detection means which detects the lane line candidate by using the original images or the bird's-eye images created from the original images or by using the synthesized bird's-eye image; and a lane line verification means which verifies whether or not the detected lane line candidate is appropriate for a lane line by using the synthesized bird's-eye images in a case where the lane line candidate detection means uses the original images or the bird's-eye image created from the original images and by using the original images or the bird's-eye images created from the original images in a case where the lane line candidate detection means uses the synthesized bird's-eye image.

* * * * *